US011529989B2

(12) United States Patent
Yoshida

(10) Patent No.: US 11,529,989 B2
(45) Date of Patent: Dec. 20, 2022

(54) STEERING APPARATUS

(71) Applicant: HITACHI AUTOMOTIVE SYSTEMS, LTD., Hitachinaka (JP)

(72) Inventor: Osamu Yoshida, Yokohama (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 946 days.

(21) Appl. No.: 16/334,722

(22) PCT Filed: Mar. 16, 2017

(86) PCT No.: PCT/JP2017/010600
§ 371 (c)(1),
(2) Date: Mar. 19, 2019

(87) PCT Pub. No.: WO2018/055807
PCT Pub. Date: Mar. 29, 2018

(65) Prior Publication Data
US 2019/0263442 A1  Aug. 29, 2019

(30) Foreign Application Priority Data
Sep. 20, 2016 (JP) .............................. JP2016-182681

(51) Int. Cl.
*B62D 5/04* (2006.01)
*B62D 3/12* (2006.01)
(Continued)

(52) U.S. Cl.
CPC ............. *B62D 5/0406* (2013.01); *B62D 3/12* (2013.01); *B62D 5/04* (2013.01); *B62D 15/0225* (2013.01);
(Continued)

(58) Field of Classification Search
CPC ...... B62D 5/04; B62D 5/0403; B62D 5/0406; B62D 15/02; B62D 15/021; B62D 15/0225
See application file for complete search history.

(56) References Cited

U.S. PATENT DOCUMENTS 4,224,833 A     9/1980  Jablonsky
9,212,892 B2 *  12/2015 Takayanagi ........ B62D 15/0215
(Continued)

FOREIGN PATENT DOCUMENTS

JP    S54-047237 A    4/1979
JP    S55-004202 A    1/1980
(Continued)

*Primary Examiner* — Tony H Winner
*Assistant Examiner* — Maurice L Williams
(74) *Attorney, Agent, or Firm* — Foley & Lardner LLP

(57) ABSTRACT

An object of the present invention is to provide a steering apparatus capable of improving a function of a bearing that supports a steering shaft. A steering apparatus includes a steering shaft, a first housing member, a second housing member, and a bearing. The steering shaft rotates according to a rotation of a steering wheel. The first housing member is located on one side in a rotational axial direction of the steering shaft, and includes a cylindrical portion and a flange portion. The cylindrical portion surrounds the steering shaft. The flange portion extends in a radial direction with respect to a rotational axis of the steering shaft to an outer side of the cylindrical portion in the radial direction. The second housing member is provided on the other side in the rotational axial direction, and forms a housing together with the first housing member. The second housing member includes a connection portion and a containing portion. The connection portion is connected to the flange portion of the first housing member. The containing portion contains a part of the steering shaft. The bearing is provided at a position that overlaps the flange portion in the rotational axial direction on an inner peripheral side of the cylindrical portion of the first housing member, and supports the steering shaft.

14 Claims, 10 Drawing Sheets

(51) Int. Cl.
*B62D 15/02* (2006.01)
*F16C 19/26* (2006.01)
*F16C 35/077* (2006.01)

(52) U.S. Cl.
CPC ............ *F16C 19/26* (2013.01); *F16C 35/077* (2013.01); *F16C 2326/01* (2013.01)

(56) References Cited

U.S. PATENT DOCUMENTS

| | | | |
|---|---|---|---|
| 9,302,700 B2* | 4/2016 | Yoshida | G01L 3/101 |
| 9,694,847 B2* | 7/2017 | Yoshida | G01L 5/221 |
| 2006/0011402 A1* | 1/2006 | Green | B62D 1/00 |
| | | | 180/312 |
| 2013/0147469 A1* | 6/2013 | Noda | G01B 7/30 |
| | | | 324/207.25 |
| 2015/0298725 A1* | 10/2015 | Kichikawa | B62D 6/10 |
| | | | 180/446 |

FOREIGN PATENT DOCUMENTS

| | | | | |
|---|---|---|---|---|
| JP | S63-047611 A | 2/1988 | | |
| JP | H10-329729 A | 12/1998 | | |
| JP | 2000-241266 A | 9/2000 | | |
| JP | 2009-097672 A | 5/2009 | | |
| JP | 2011-122943 A | 6/2011 | | |
| WO | WO-2014141738 A1 * | 9/2014 | ............... | B62D 6/10 |

* cited by examiner

STEERING APPARATUS

TECHNICAL FIELD

The present invention relates to a steering apparatus.

BACKGROUND ART

PTL 1 discloses a steering apparatus.

CITATION LIST

Patent Literature

[PTL 1] Japanese Patent Application Public Disclosure No. 2011-122943

SUMMARY OF INVENTION

Technical Problem

The conventional steering apparatus has left room to improve a function of a bearing that supports a steering shaft.

Solution to Problem

According to one aspect of the present invention, a steering apparatus includes a housing member including a cylindrical portion surrounding a steering shaft and a flange portion extending to an outer side of the cylindrical portion in a radial direction. A bearing is provided at a position that overlaps the flange portion in a rotational axial direction of the steering shaft on an inner peripheral side of the cylindrical portion.

Therefore, according to the one aspect of the present invention, the function of the bearing can be improved.

DESCRIPTION OF EMBODIMENTS

In the following description, embodiments for implementing the present invention will be described with reference to the drawings.

[First Embodiment]

Figure 1:
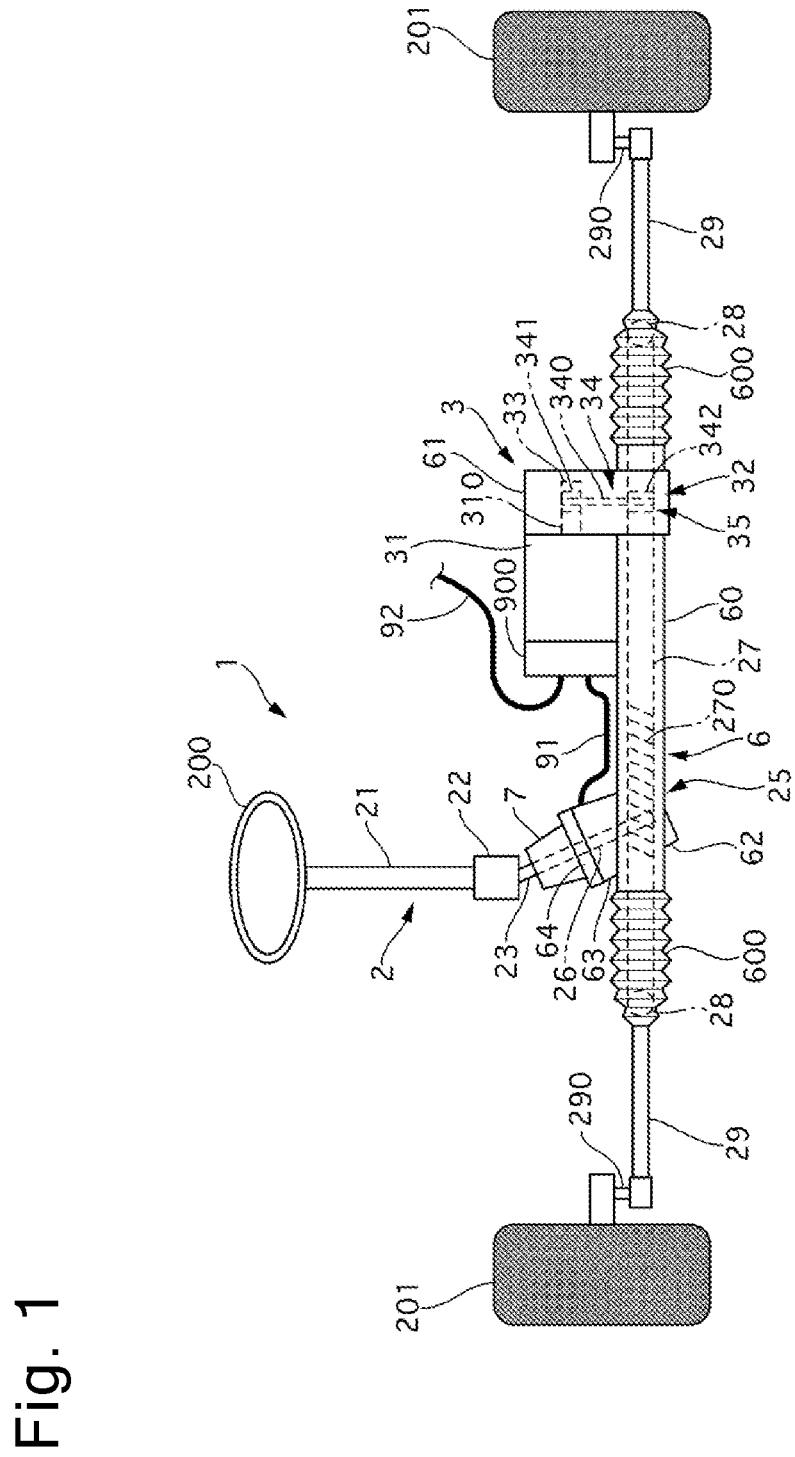
FIG. 1 is a schematic view of a steering apparatus according to a first embodiment.
Figure 2:
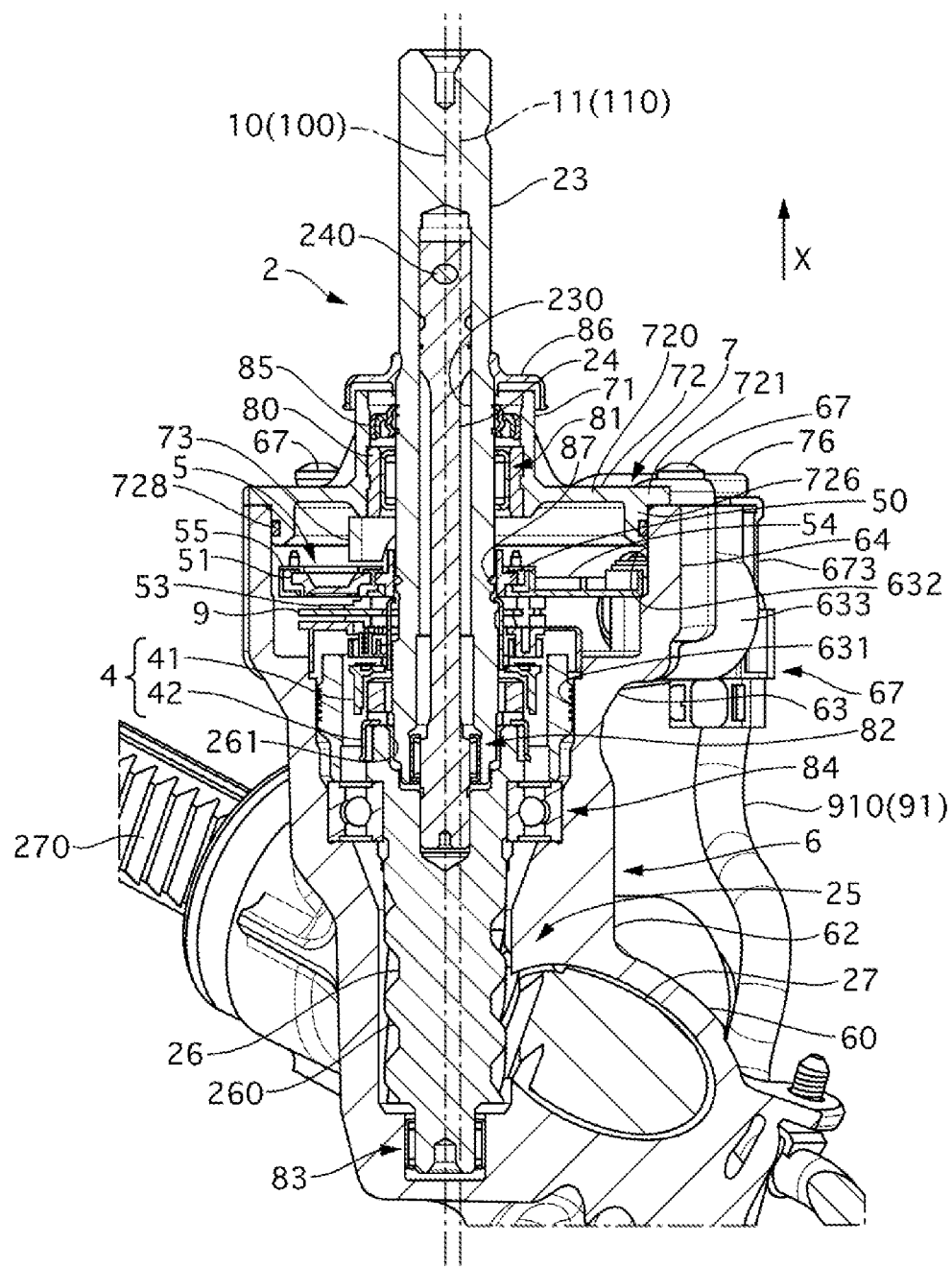
FIG. 2 is a cross-sectional view of the steering apparatus according to the first embodiment taken along a plane passing through a rotational axis of a steering shaft (corresponding to a cross section as viewed along a line II to II illustrated in FIG. 6).

First, a configuration will be described. A steering apparatus 1 according to the present embodiment is mounted on an automobile. As illustrated in FIG. 1, the steering apparatus 1 includes a housing, a steering mechanism 2, an assist mechanism 3, a steering torque sensor unit 4, a steering angle sensor unit 5, and a control unit 900. The steering mechanism 2 includes an intermediate shaft 21, a steering shaft (a steering rod) 23, and a transmission mechanism 25. The intermediate shaft 21 is a first steering input shaft, and is coupled with a steering wheel (a driving wheel) 200. The steering shaft 23 is a second steering input shaft, and one axial end side thereof is coupled with the intermediate shaft 21 via a universal joint (a universal coupling) 22. As illustrated in FIG. 2, an axially extending bottomed hole 230 is provided inside the steering shaft 23, and the hole 230 is opened on the other axial end side of the steering shaft 23. A torsion bar 24 is set in this hole 230. One axial end side of the torsion bar 24 is fixed to the steering shaft 23 via a pin 240.

The transmission mechanism 25 includes a pinion shaft 26 and a rack shaft 27. The pinion shaft 26 is a steering output shaft, and is coupled with the steering shaft 23 via the torsion bar 24. The other axial end side of the torsion bar 24 is fixed to one axial end side of the pinion shaft 26 by press-fitting. The other axial end side of the steering shaft 23 is rotatably fitted inside a recessed portion 261 on the one axial end side of the pinion shaft 26 and on an outer peripheral side of the torsion bar 24. A second bearing 82 is provided between the outer periphery of the torsion bar 24 and an inner periphery of the hole 230 of the steering shaft 23. The second bearing 82 is a needle bearing. A pinion gear 260 is provided on an outer periphery of the pinion shaft 26. The rack shaft 27 is an axially movable rack bar. Rack teeth (a rack gear) 270 are provided on a part of an outer periphery of the rack shaft 27. The pinion gear 260 and the rack gear 270 are meshed with each other. The tie rods 29 are connected to both axial ends of the rack shaft 27 via ball joints 28. Turning target wheels (vehicle wheels) 201 are coupled with the tie rods 29 via knuckle arms 290.

The assist mechanism 3 includes an electric motor 31 and a speed reducer 32. The electric motor 31 is an electrically-driven motor, and is, for example, a three-phase brushless DC motor. A rotational angle sensor 33 such as a resolver, which detects a rotational angle or a rotational position of an output shaft 310, is provided on the output shaft 310 of the electric motor 31. The speed reducer 32 is provided between the steering mechanism 2 (the rack shaft 27) and the electric motor 31. The speed reducer 32 includes a belt transmission mechanism 34 and a ball screw mechanism 35. The belt transmission mechanism 34 includes an input pulley 341, an output pulley 342, and a belt 340. The input pulley 341 rotates integrally with the output shaft 310. The output pulley 342 rotates integrally with a nut of the ball screw mechanism 35. The nut surrounds the rack shaft 27, and is rotatable relative to the rack shaft 27. The belt 340 is wound between the output pulley 342 and the input pulley 341.

The steering torque sensor unit 4 is provided in a boundary region between the steering shaft 23 and the pinion shaft 26, and includes a first rotational sensor 41, a second rotational sensor 42, and a sensor substrate 9. The first rotational sensor 41 detects a rotational angle of the steering shaft 23. The first rotational sensor 41 includes a magnet and a Hall element (a Hall IC), and outputs a change in a magnetic field changing according to a rotational position of the steering shaft 23 to the sensor substrate 9 as an electric signal (a sine-wave signal of a voltage). Similarly, the second rotational sensor 42 detects a rotational angle of the pinion shaft 26, and outputs it to the sensor substrate 9 as an electric signal. The steering sensor unit 5 is provided in a region of the steering shaft 23. The unit 5 includes a first rotational sensor 53 and a second rotational sensor on the sensor substrate 9. These first and second rotational sensors detect the rotational angle of the steering shaft 23, and outputs it as an electric signal.

The control unit (ECU) 900 is an electronic control unit including a microcomputer. The ECU 900 is connected to the electric motor 31 and the rotational angle sensor 33, and is also electrically connected to the sensor substrate 9 (the steering torque sensor unit 4 and the steering angle sensor unit 5) via a harness 91. The ECU 900 is also connected to another sensor and another controller via a CAN communication line 92, and can receive signals from them. The ECU 900 detects a torque (a steering torque) input to the steering wheel 200 according to a steering operation performed by a driver and generated on the steering mechanism 2 based on the signal input from the steering torque sensor 4. Further, the ECU 900 detects a rotational angle of the steering wheel 200 (the steering shaft 23), i.e., a steering absolute angle based on the signal input from the steering sensor unit 5. The ECU 900 calculates a target steering assist force based on the steering torque and the like, and outputs a driving signal to the electric motor 31 based on a signal such as this target steering assist force and an input rotational position of the electric motor 31. The ECU 900 controls an output of the electric motor 31 by controlling a current flowing to the electric motor 31.

The steering mechanism 2 transmits the rotation of the steering wheel 200 steered by the driver (a steering operation force input from the driver to the steering wheel 200) to each of the turning target wheels 201. The rotational force is transmitted from the steering wheel 200 to the intermediate shaft 21. The steering shaft 23 rotates according to the rotation of the steering wheel 200 (the intermediate shaft 21). The steering shaft 23 functions as an operation mechanism of the steering apparatus 1 together with the steering wheel 200 and the intermediate shaft 21. The transmission mechanism 25 converts the rotational motion of the steering shaft 23 into a motion of each of the turning target wheels 201 in an axle direction, thereby turning the turning target wheel 201 according to the rotation of the steering shaft 23. The steering operation performed by the driver that is input to the steering wheel 200 is transmitted to the rack shaft 27 via the intermediate shaft 21, the steering shaft 23, and the pinion shaft 26. The pinion shaft 26 and the rack shaft 27 form a rack and pinion gear, and function as a gear mechanism of the steering apparatus 1. The pinion shaft 26 rotates integrally with the steering shaft 23 with a rotational force transmitted from the steering shaft 23 thereto via the torsion bar 24. The rack shaft 27 turns the turning target wheel 201 by axially moving according to the rotation of the steering shaft 23 (the pinion shaft 26). The motion of the rack shaft 27 in the vehicle width direction is converted into a motion of the turning target wheel 201 in a turning target direction by the knuckle arm 290. The rack shaft 27 functions as a wheel turning shaft.

The assist mechanism 3 assists the steering operation force input by the driver. The assist mechanism 3 is an electrically driven (directly connected) power steering apparatus, and a rack assist-type power steering apparatus in which the electric motor 31 provides assist power to the axial motion of the rack shaft 27. The electric motor 31 is driven by power supplied from a power source (a battery) mounted on the vehicle, and provides the assist force to the rack shaft 27 via the speed reducer 32. The speed reducer 32 transmits the output of the electric motor 31 to the rack shaft 27 while slowing down the rotation of the output shaft 310 (amplifying a torque generated by the electric motor 31). The output of the electric motor 31 is slowed down by the belt transmission mechanism 34. The rotational motion of the output pulley 342 is converted into an axial motion of the rack shaft 27 by the ball screw mechanism 35. The driving force of the electric motor 31 is transmitted to the rack shaft 27 via the ball screw mechanism 35, by which the assist force (a steering assist force) is provided to the steering force input by the driver. The ECU 900 functions as a controller of the steering apparatus 1, and can perform assist control. When the steering wheel 200 is steered by the driver, the ECU 900 controls the output of the electric motor 31, thereby leading to supply of appropriate assist power to the rack shaft 27 and achieving assist to the steering force input by the driver.

Figure 3:
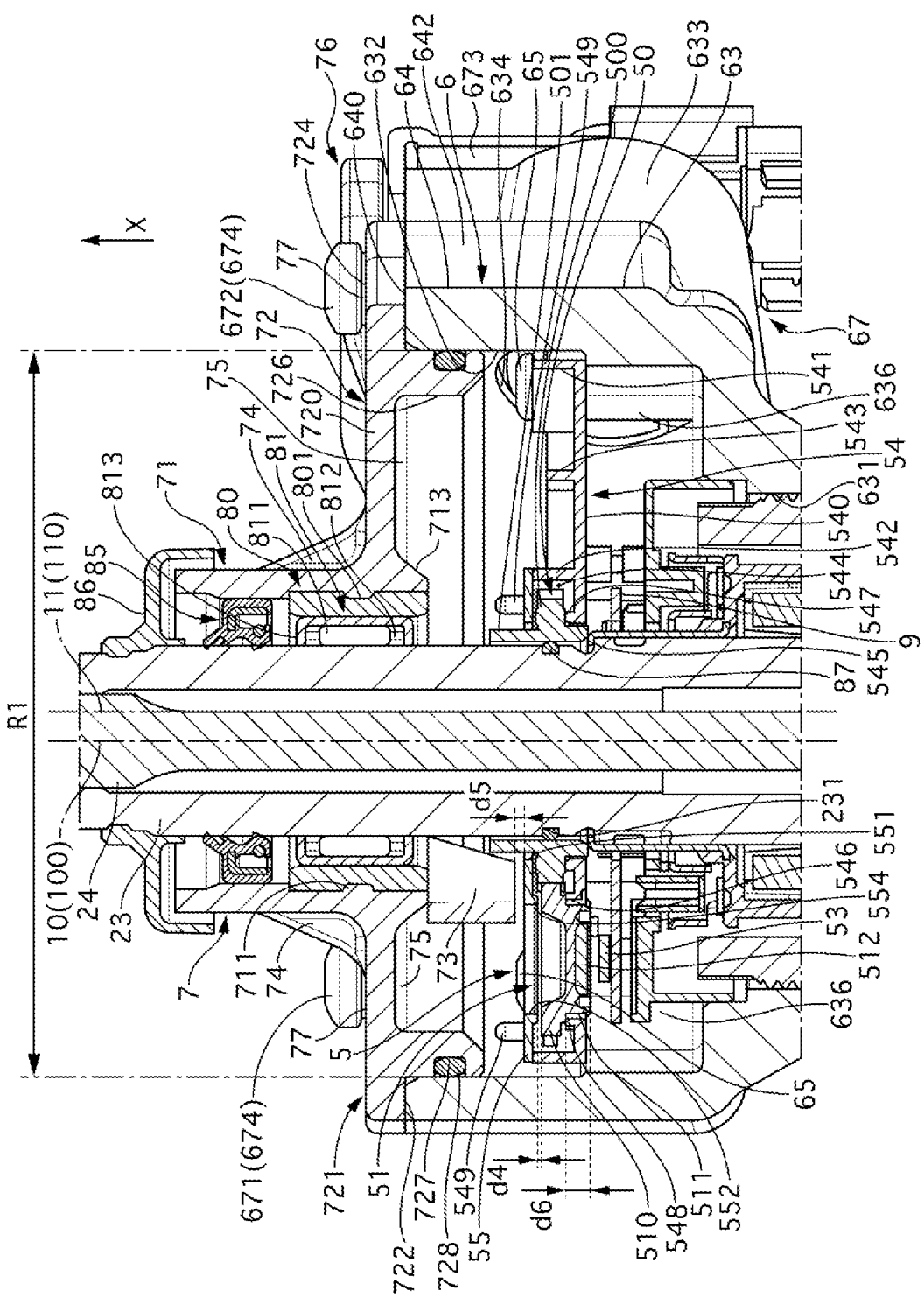
FIG. 3 is an enlarged view of a part of FIG. 2.
Figure 6:
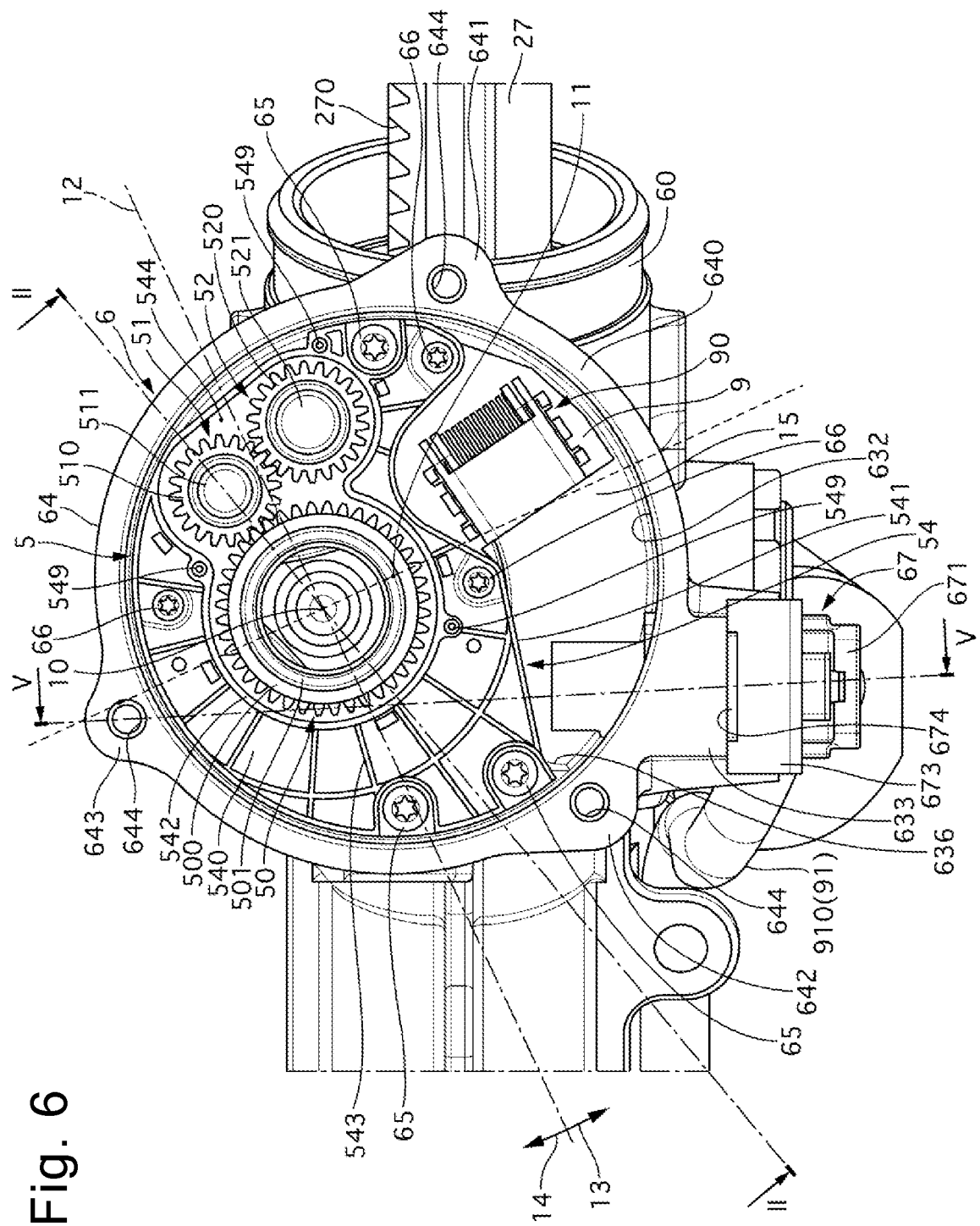
FIG. 6 illustrates the steering apparatus with a cover member, the steering shaft, and a sensor cover according to the first embodiment removed therefrom as viewed from a rotational axial direction of the steering shaft.

In the following description, the steering angle sensor unit 5 will be described. As illustrated in FIGS. 3 and 6, the steering angle sensor unit 5 includes an input gear 50, a first gear 51, a second gear 52, the first rotational sensor 53, the second rotational sensor, a case 54, a cover 55, and the sensor substrate 9. The input gear (a main gear) 50 is a relatively large first external gear. The input gear 50 includes a main body portion 500 and a shaft portion 501. The main body portion 500 includes a plurality of (forty) teeth on an outer periphery thereof. The shaft portion 501 is cylindrical, and protrudes to both axial sides of the main body portion 500 and extends in a rotational axial direction of the input gear 50. The input gear 50 is provided on an outer periphery of the steering shaft 23. A groove 231 extending in a circumferential direction around a rotational axis of the steering shaft 23 is provided on the outer periphery of the steering shaft 23. An O-ring 87 is set in the groove 231. With the input gear 50 mounted on the steering shaft 23, an outer periphery of the O-ring 87 closely contacts an inner periphery of the shaft portion 501 of the input gear 50, and the O-ring 87 is deformably compressed. The input gear 50 rotates integrally with the steering shaft 23 due to friction between the O-ring 87 and the shaft portion 501.

The first gear (a primary detection gear) 51 is a relatively small second external gear. The input gear 51 includes a main body portion 510 and a shaft portion 511. The main body portion 510 includes a plurality of teeth on an outer periphery thereof. The number of teeth of the first gear 51 is 20. The shaft portion 511 has a bottomed cylindrical shape, and protrudes from the main body portion 510 and extends to one side of the first gear 51 in a rotational axial direction thereof. A magnetic member 512 is mounted inside the shaft portion 511. The magnetic member 512 is magnetized so as to have an N pole and an S pole arranged in a circumferential direction around the rotational axis of the first gear 51. The magnetic member 512 may include one pair of N and S poles or may include two or more pairs of N and S poles. The second gear (a secondary detection gear) 52 is a relatively small third external gear. The number of teeth of the second gear 52 is 22. The other configuration of the second gear 52 is similar to the first gear 51. The first gear 51 is meshed with the input gear 50. The second gear 52 is meshed with the first gear 51.

The case (the sensor housing) 54 has a shallow bottomed cylindrical shape, and an outer circumferential wall 541 thereof has a shape with a part of the circle cut out as viewed from an axial direction of the case 54. The case 54 includes a space 544 containing the first and second gears 51 and 52. A rib 543 is provided between a circumferential wall 542 of the containing space 544 and the outer circumferential wall 541 of the case 54. A first hole 545, a second hole 546, and a third hole penetrate through a bottom portion 540 of the case 54 in the containing space 544. A protrusion portion 547 with which an opening of the first hole 545 is edged, a protrusion portion 548 with which an opening of the second hole 546 is edged, and a protrusion portion with which an opening of the third hole is edged protrude to an inner peripheral side of the case 54. The case 54 includes a plurality of (three) pins 549 along the circumferential wall 542 of the containing space 544. These pines 549 extend in an axial direction of the case 54 and protrude from an opening of the case 54. The shaft portion 501 of the input gear 50 is fitted in the first hole 545 via a radial space therebetween. One side of the main body portion 500 in the rotational axial direction is in contact with the protrusion portion 547. The shaft portion 511 of the input gear 51 is fitted in the second hole 546 via a radial space therebetween. One side of the main body portion 510 in the rotational axial direction is in contact with the protrusion portion 548. The shaft portion of the second gear 52 is fitted in the third hole via a radial space therebetween. One side of the main body portion 520 in the rotational axial direction is in contact with the protrusion portion (with which the opening of the third hole is edged).

The cover (a sensor cover) 55 closes an opening of the containing space 544 of the case 54. The cover 55 is shaped like a thin plate. A first hole 551, a second hole 552, and a third hole penetrate through the cover 55. A protrusion portion 554 with which an opening of the second hole 552 is edged, and a protrusion portion with which an opening of the third hole is edged protrude to a surface of the cover 55 on one side thereof. Further, a pin hole is provided along an outer periphery of the cover 55. A pin 549 penetrates through the pin hole. The shaft portion 501 of the input gear 50 is fitted in the first hole 551 via a radial space therebetween. The other side of the main body portion 510 of the first gear 51 in the rotational axial direction faces the protrusion portion 554 of the cover 55 via an axial space therebetween. The other side of the main body portion 520 of the second gear 52 in the rotational axial direction faces the protrusion portion (with which the opening of the third cover is edged) of the cover 55 via an axial space therebetween.

The magnetic members 512 and the like of the first and second gears 51 and 52 are exposed on the bottom portion 540 of the case 54 on an opposite side of the containing space 544, and face the sensor substrate 9. The sensor substrate 9 includes the first rotational sensor 53 arranged so as to face the first gear 51, and the second rotational sensor arranged so as to face the second gear 52. Each of the rotational sensor 53 and the like is a magnetoresistance effect sensor, and includes a magnetoresistance effect element (an MR element). Each of the rotational sensor 53 and the like detects a change in a magnetic field generated between the N pole and the S pole of the magnetic member 512 or the like as a change in a resistance value of the above-described element. The first rotational sensor 53 detects a rotational angle of the first gear 51. More specifically, the first rotational sensor 53 outputs a change in magnetic resistance changing according to a rotational position of the first gear 51 as an electric signal (a sine-wave signal of a voltage). Similarly, the second rotational sensor detects a rotational angle of the second gear 52, and outputs it as an electric signal. The number of teeth of the first gear 51 and the number of teeth of the second gear 52 are not divisible by each other, and therefore the rotational angle of the steering shaft 23 can be detected even if exceeding 360 degrees with use of a combination of the detection value of the first rotational sensor 53 and the detection value of the second rotational sensor.

As illustrated in FIG. 6, a connector 90 is mounted on the sensor substrate 9. The connector 90 is a substrate-to-wire connector, and is connected to the steering torque sensor 4 (the first and second rotational sensors 41 and 42) and the steering angle sensor unit 5 (the first and second rotational sensors 53 and the like) via terminals, and a terminal of the harness 91 for a connection to the ECU 900 is also connected thereto. An electric signal output from each of the rotational sensors 41 and 53 and the like is output to the ECU 900 via the connector 90 and the harness 91.

The housing contains the steering mechanism 2 and the speed reducer 32. The housing includes a housing main body 6 and a cover member 7. The housing main body 6 is made from an aluminum metallic material. The housing main body 6 may be made from a ferrous metallic material. The housing main body 6 includes a rack shaft containing portion 60, a speed reducer containing portion 61, a gear containing portion 62, a sensor containing portion 63, and a connection portion 64. These portions are formed as one integrated member. The rack shaft containing portion 60, the speed reducer containing portion 61, the gear containing portion 62, and the sensor containing portion 63 may be different members from one another, or may be divided into several members as blocks. The sensor containing portion 63 and the connection portion 64 are formed as one integrated member. As illustrated in FIG. 1, the rack shaft containing portion 60 is cylindrical, and is opened at both axial ends thereof. The rack shaft containing portion 60 is a rack tube containing the rack shaft 27. The rack shaft 27 penetrates through the rack shaft containing portion 60. Both axial ends of the rack shaft 27 are exposed from the rack shaft containing portion 60. Dust boots 600 are attached to both axial ends of the rack shaft containing portion 60 so as to cover portions where the rack shaft 27 and the tie rods 29 are coupled with each other, respectively. The speed reducer containing portion 61 is provided on one axial side of the rack shaft containing portion 60, and protrudes outward in a radial direction with respect to the axis of the rack shaft containing portion 60. The speed reducer containing portion 61 contains the speed reducer 32.

The gear containing portion 62 and the sensor containing portion 63 are provided on the other axial side of the rack shaft containing portion 60, and extend obliquely with respect to the axis of the rack shaft containing portion 60. As illustrated in FIG. 2, the gear containing portion 62 contains the pinion gear 260 and the rack gear 270. An inner peripheral surface of the gear containing portion 62 has a bottomed cylindrical shape, and a part thereof is opened to an inner peripheral surface of the rack shaft containing portion 60. The other axial end side of the pinion shaft 26 is supported on a bottom portion side of the inner peripheral surface of the gear containing portion 62 via a third bearing 83. The third bearing 83 is a needle bearing. The axis of the pinion shaft 26 and an axis of the inner peripheral surface of the gear containing portion 62 substantially coincide with each other (within a range of a tolerance and rattling of the bearing). The rack shaft containing portion 60 contains a coil spring for pressing the rack gear 270 against the pinion gear 260.

The sensor containing portion 63 contains a part of the steering shaft 23, a part of the pinion shaft 26, the steering torque sensor unit 4, and the steering angle sensor unit 5. An inner peripheral surface of the sensor containing portion 63 has a stepped cylindrical shape with a small-diameter first cylindrical portion 631 and a large-diameter second cylindrical portion 632 overlapping in an axial direction thereof. The first cylindrical portion 631 extends on an axis 10 generally the same as the inner peripheral surface of the gear containing portion 62. The second cylindrical portion 632 extends on an axis 11 in parallel with and offset from the axis 10 of the first cylindrical portion 631. For convenience of the description, an X axis is set to a direction in which the axes 10 and 11 extend. A positive direction is defined to be the sensor containing portion 63 side with respect to the gear containing portion 62. The first cylindrical portion 631 is continuous to an X-axis positive direction side of the inner peripheral surface of the gear containing portion 62, and the second cylindrical portion 632 is continuous to an X-axis positive direction side of the first cylindrical portion 631. An X-axis positive direction side of the second cylindrical portion 632 is opened. This opening is closed by the cover member 7.

A fourth bearing 84 is set at an end of the first cylindrical portion 631 in an X-axis negative direction. The bearing 84 is a ball bearing. The one axial end side of the pinion shaft 26 is supported on the first cylindrical portion 631 via the fourth bearing 84. The steering shaft 23 fitted to the one axial end side of the pinion shaft 26 penetrates through the cover member 7 while extending inside the sensor containing portion 63 on the generally same axis as the pinion shaft 26. The cover member 7 is located on the one side of the steering shaft 23 in the rotational axial direction (an X-axis positive direction side), and the sensor containing portion 63 is located on the other side of the steering shaft 23 in the rotational axial direction (an X-axis negative direction side). The rotational axis of the pinion shaft 23 substantially coincides with the axis 10 of the first cylindrical portion 631 (within a range of a tolerance and rattling of the bearing).

Figure 5:
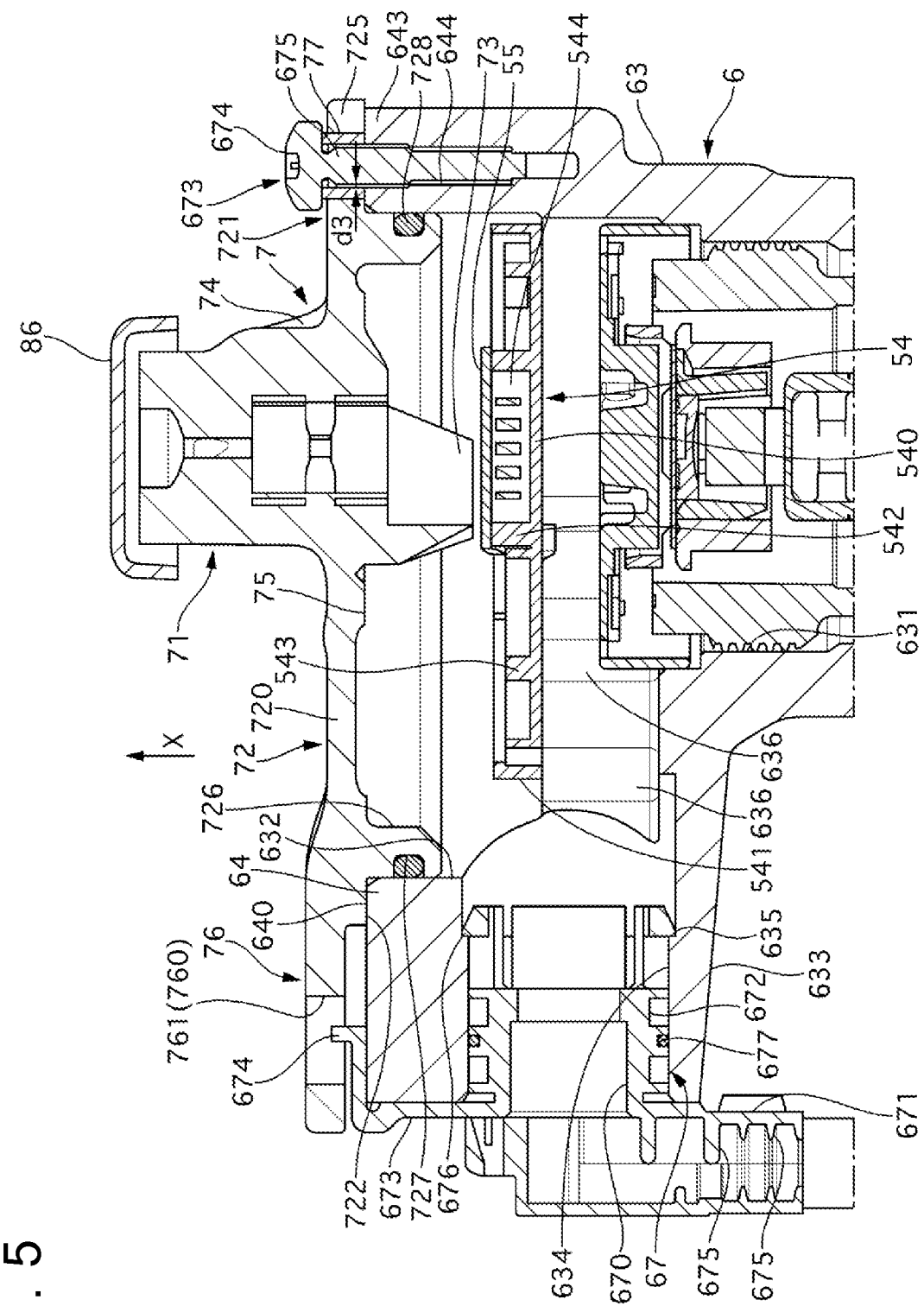
FIG. 5 is a cross-sectional view of the steering apparatus according to the first embodiment taken along a plane in parallel with the rotational axis of the steering shaft (corresponding to a cross section as viewed along a line V to V illustrated in FIGS. 6 and 7).

As illustrated in FIGS. 5 and 6, a portion 633 protruding from an outer periphery of the sensor containing portion 63 is provided on an X-axis positive direction side of the sensor containing portion 63. A hole 634 is provided inside this protrusion portion 633. The hole 634 extends in a plane perpendicular to the axis 10 to penetrate through the protrusion portion 633. The hole 634 is opened to the second cylindrical portion 632, and is also opened to an outer peripheral surface of the sensor containing portion 63. A step 635 is provided on an inner peripheral surface of the hole 634. A plurality of portions 636 protruding radially inward (the axis 11 side) is provided on an X-axis negative direction side of the second cylindrical portion 632. A surface of each of the protrusion portions 636 on the X-axis positive direction side is located in the same plane perpendicular to the X axis. A screw hole is provided inside each of these protrusion portions 636. The screw hole extends in the X-axis direction to be opened to a plane of the protrusion portion 636 on the X-axis positive direction side.

The steering torque sensor unit 4 and the steering angle sensor unit 5 are installed around the steering shaft 23 in the sensor containing portion 63. The steering torque sensor unit 4 is disposed on one side in the X-axis direction that is closer to the gear containing portion 62 (the X-axis negative direction side) and the steering angle sensor unit 5 is disposed on the other side in the X-axis direction that is closer to the opening of the sensor containing portion 63 (the cover member 7) (the X-axis positive direction side). The steering torque sensor unit 4 is mainly surrounded by the second cylindrical portion 632, and the steering angle sensor unit 5 is surrounded by the first cylindrical portion 631. The case 54 of the steering sensor unit 5 is in contact with the surfaces of the protrusion portions 636 on the X-axis positive direction side. The case 54 extends perpendicularly to the X axis. The rotational axis of each of the gears 50 to 52 extends in the X-axis direction. A screw 65 is tightened in the above-described screw hole, by which the case 54 is fixed to the protrusion portions 636 (the sensor containing portion 63). The sensor substrate 9 is fixedly fastened to the case 54 with use of a screw 66, and extends perpendicularly to the X axis. The sensor substrate 9 is sandwiched between the steering angle sensor unit 5 and the steering torque sensor unit 4 in the X-axis direction. The sensor substrate 9 is located on an opposite side of the case 54 and the cover 55 (the first gear 51 and the second gear 52) from the cover member 7 in the X-axis direction. The sensor substrate 9 faces the bottom portion 540 of the case 54 and does not face the cover 55 in the X-axis direction. The rotational sensor 53 and the like are placed on a surface of the sensor substrate 9 on the X-axis positive direction side (one side facing the bottom portion 540).

As illustrated in FIG. 6, a straight line 12 extends perpendicularly to a straight light passing through the axis 10 and the axis 11 and passes through the axis 10 when the sensor containing portion 63 is viewed from the X-axis direction. This straight line 12 is defined to be an imaginary line. The imaginary line 12 extends perpendicularly to the axis 10.

As viewed from the X-axis direction, the case 54 partially covers the opening of the sensor containing portion 63. As viewed from the X-axis direction, a portion of the sensor substrate 9 where the connector 90 is mounted is positioned in a region 15 surrounded by the outer circumferential wall 541 of the case 54 and the inner peripheral surface of the sensor containing portion 63 (the second cylindrical portion 632). The hole 634 of the protrusion portion 633 is opened on the inner peripheral surface of the sensor containing portion 63 in the region 15. The harness 91 connected to the connector 90 passes through the hole 634 from the region 15 to extend out of the sensor containing portion 63. As illustrated in FIGS. 5 and 6, a holding plug 67 is mounted in the hole 634. The holing plug 67 is made from resin, and integrally includes a holding portion 671, a plug portion 672, and a clamp portion 673. The holding portion 671 and the plug portion 672 are cylindrical, and extend perpendicularly to each other. One passage 670 penetrates through inside the holding portion 671 and the plug portion 672. A plurality of protrusion portions 675 protruding in a labyrinth manner or a bellows manner is provided on an inner periphery of the passage 670 in the holding portion 671. The harness 91 is held due to contacts of these protrusions 675 to the harness 91. A tube 910 containing the harness 91 is connected to an opening portion of the passage 670 in the holding portion 671. A part of the region 15 in the sensor containing portion 63, the protrusion portion 633, and the holding plug 67 function as a passage of the harness 91. A claw 676 is provided so as to surround an opening portion of the passage 670 in the plug portion 672. An O-ring 677 is set on an outer periphery of the plug portion 672. The clamp portion 673 is connected to an outer periphery of one side of the plug portion 672 that is connected to the holding portion 671. The clamp portion 673 is shaped like a perpendicularly bent plate, and a protrusion 674 protruding outward in a radial direction of the plug portion 672 is provided at a distal end thereof. A distal end of the protrusion 674 extends perpendicularly to an axis of the plug portion 672. The plug portion 672 is fitted to the hole 634 of the protrusion portion 633. The claw 676 is engaged with the step 635 of the hole 634. The claw 676 functions as snap-fit. The O-ring 677 is in contact with an inner peripheral surface of the hole 634. The O-ring 677 exerts a seal function, and prevents or reduces entry of water and the like that attempt to intrude into the sensor containing portion 63 by passing through a space between the inner peripheral surface of the hole 634 and the outer peripheral surface of the plug portion 672 from the opening of the hole 634 on the outer periphery of the sensor containing portion 63. The clamp portion 673 sandwiches an X-axis positive direction side of the protrusion portion 633.

The connection portion 64 includes a surface 640 and screw mounting portions 641 to 643. The surface 640 is an end surface of the sensor containing portion 63 on the X-axis positive direction side, and surrounds the opening of the sensor containing portion 63 and extends perpendicularly to the X axis. A surface of the above-described protrusion portion 633 on the X-axis positive direction side extends on the same plane as the surface 640. The screw mounting portions 641 to 643 each include a portion protruding from an outer periphery of the sensor containing portion 63 on the X-axis positive direction side (in a direction away from the axis 11). The three screw mounting portions 641 to 643 are provided at generally even intervals in a circumferential direction around the axis 11, and include the first mounting portion 641, the second mounting portion 642, and the third mounting portion 643. A bottomed screw hole 644 extends in the X-axis direction inside each of the mounting portions 641 to 643, and is opened to the surface 640.

As viewed from the X-axis direction, an axis of the screw hole 644 of each of the first mounting portion 641 and the second mounting portion 642, the rotational axis of the second gear 52, and the connector 90 are located in a region 13 on one side of the imaginary line 12 in a radial direction with respect to the axis 10. An axis of the screw hole 644 of the third mounting portion 643 and the rotational axis of the first gear 51 are located in a region 14 on the other side of the imaginary line 12 in the radial direction with respect to the axis 10.

Figure 7:
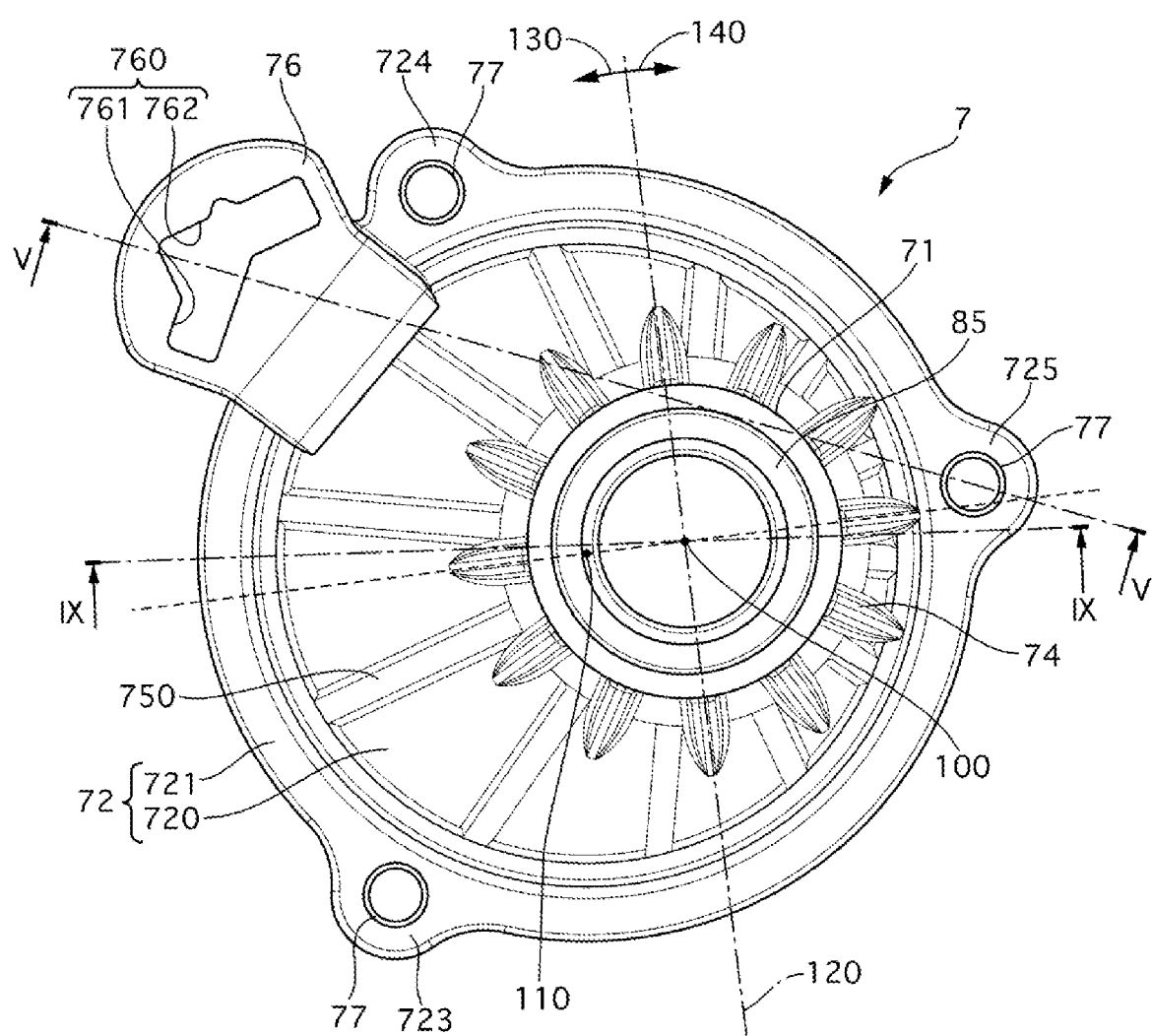
FIG. 7 is a front view of the cover member according to the first embodiment as viewed from an axial direction of a cylindrical portion.
Figure 8:
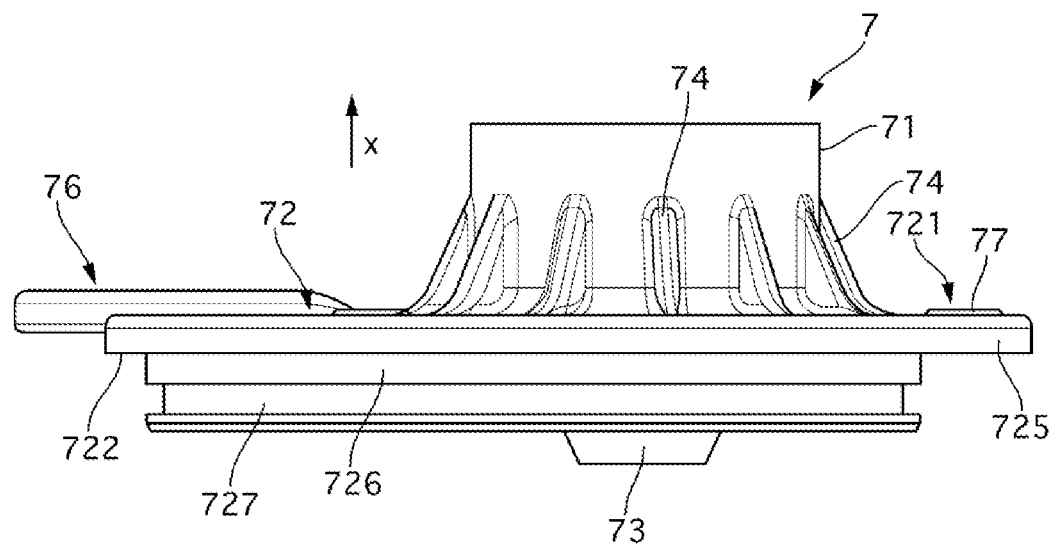
FIG. 8 is a side view of the cover member according to the first embodiment as viewed from a direction perpendicular to an axis of the cylindrical portion.
Figure 9:
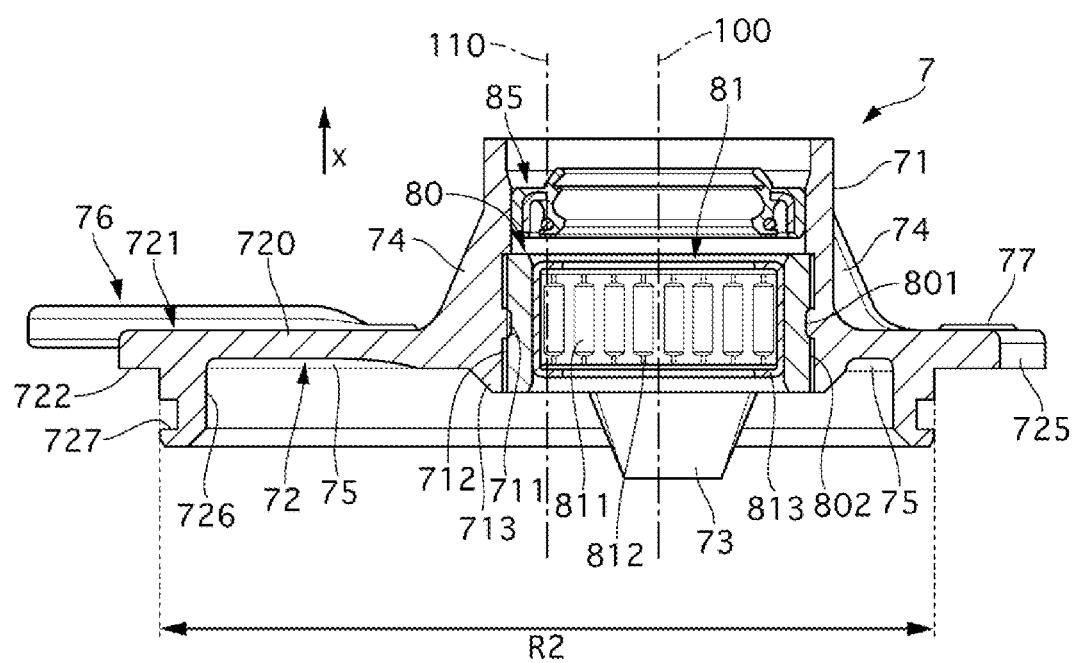
FIG. 9 is a cross-sectional view of the cover member according to the first embodiment taken along a plane passing through the axis of the cylindrical portion (corresponding to a cross section as viewed along a line IX to IX in FIG. 7).

The cover member 7 forms the housing together with the housing main body 6. The cover member 7 functions as a first housing member, and the sensor containing portion 63 and the connection portion 64 of the housing main body 6 function as a second housing member. The cover member 7 supports the steering shaft 23. The cover member 7 is mainly made from a resin material. As illustrated in FIGS. 7 to 9, the cover member 7 includes a cylindrical portion 71, a flange portion 72, a protrusion portion 73, first rib portions 74, second rib portions 75, and a protrusion portion 76.

The cylindrical portion 71 is a cylindrical portion surrounding the steering shaft 23. An oil seal 85, a sleeve member 80, and a first bearing 81 are set on an inner periphery of the cylindrical portion 71. For convenience of the description, an x axis is set to a direction in which an axis 100 of the cylindrical portion 71 extends. A positive direction is defined to be the oil seal 85 side with respect to the first bearing 81. The oil seal 85 is equipped with a spring and a dust guard. An outer periphery of the oil seal 85 is fixed to an inner peripheral surface of an x-axis positive direction side of the cylindrical portion 71. Both sides of the cylindrical portion 71 in the x-axis direction are opened. A first protrusion (a circumferential protrusion) 711 extending in a circumferential direction around the axis 100, and second protrusions (axial protrusions) 712 extending in the x-axis direction are provided on an x-axis negative direction side of the inner peripheral surface of the cylindrical portion 71. The first protrusion 711 is one protrusion. The second protrusions 712 are a plurality of protrusions arranged in the circumferential direction around the x axis. A groove between the second protrusions 712 adjacent to each other has a V-like shape. The first protrusion 711 is located at a generally central position of the second protrusion 712 in the x-axis direction.

Figure 10:
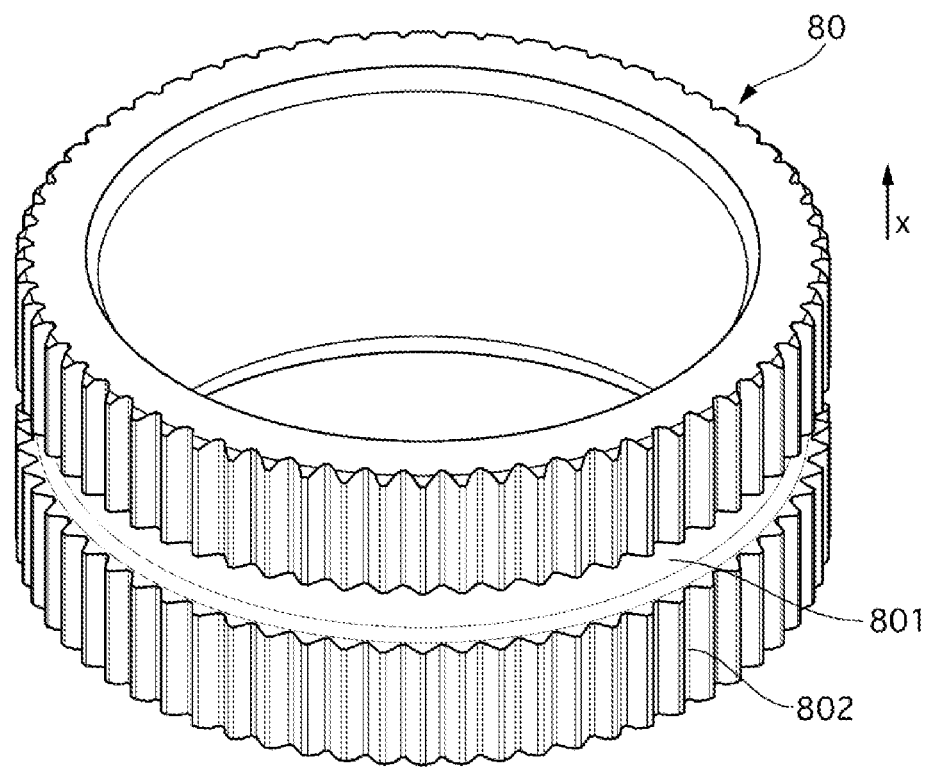
FIG. 10 is a perspective view of a sleeve member according to the first embodiment.
Figure 11:
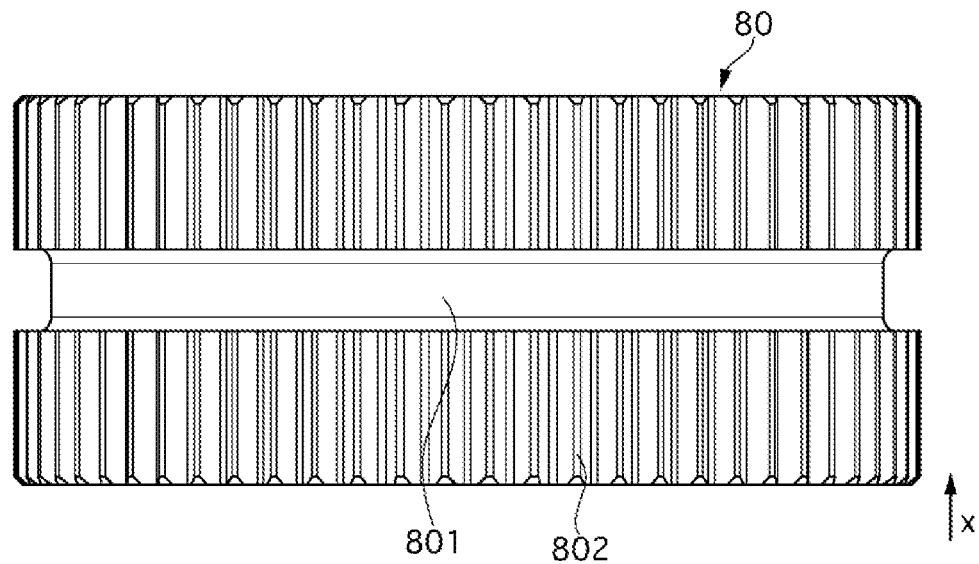
FIG. 11 is a side view of the sleeve member according to the first embodiment as viewed from a direction perpendicular to the axis.

As illustrated in FIGS. 10 and 11, the sleeve member 80 is cylindrical. The sleeve member 80 is made from a metallic material. Both axial ends of an inner peripheral surface of the sleeve member 80 each have a tapering shape increasing in diameter toward an opening portion. A first groove (a circumferential groove) 801 extending in a circumferential direction around the x axis and second grooves (axial grooves) 802 extending in the y-axis direction are provided on an outer periphery of the sleeve member 80. The first groove 801 is one groove. The second grooves 802 each have a V-like shape, and are provided in an entire axial range of the sleeve member 80. The second grooves 802 are a plurality of grooves arranged in the circumferential direction around the axis of the sleeve member 80. The first groove 801 is located at a generally central position of the sleeve member 80 (the second groove 802) in the x-axis direction. The sleeve member 80 is fixed to the cover member 7 (the cylindrical portion 71) by insert-molding. An outer periphery of the sleeve member 80 is fitted to an inner periphery of an x-axis negative direction side of the cylindrical portion 71. The first protrusion 711 of the cylindrical portion 71 is fitted in the first groove 801. The second protrusions 712 are fitted in the second grooves 802, respectively. The protrusion of the cylindrical portion 71 may be replaced with a groove, and the groove of the sleeve member 80 may be replaced with a protrusion.

As illustrated in FIG. 9, the first bearing 81 is a needle roller bearing (a needle bearing). The first bearing 81 includes a plurality of rolling members 811, a holder 812, and an outer race 813. The holder 812 holds the plurality of rolling members 811. The outer race 813 holds an assembly of the holder 812 and the rolling members 811 on an inner periphery thereof. The outer race 813 is shaped like a shell, and is formed by, for example, performing a deep-drawing process on a steel sheet. An outer periphery of the outer race 813 is fitted to an inner periphery of the sleeve member 80, and is fixed thereto. A dimension (an axial length) of the first bearing 81 (the outer race 813) is smaller than a dimension (an axial length) of the sleeve member 80 in the x-axis direction. The first bearing 81 (the outer race 813) is located at an intermediate portion of the sleeve member 80 in the x-axis direction. In other words, the first bearing 81 entirely overlaps the sleeve member 80 in the x-axis direction. That is, the above-described intermediate portion of the sleeve member 80 does not mean a midpoint at which the sleeve member 80 is divided in half in the x-axis direction but means a portion of the sleeve member 80 between both ends thereof in the x-axis direction. The sleeve member 80 protrudes from the first bearing 81 to both the sides in the x-axis direction. The rolling members 811 face the outer peripheral surface of the steering shaft 23 contactably with this outer peripheral surface.

The flange portion 72 includes a main body portion 720 and a connection portion 721. The main body portion 720 extends to a radially outer side of the cylindrical portion 71 in the radial direction with respect to the axis 100 (extends perpendicularly to the x axis). The main body portion 720 is shaped like a disk, and an outer shape thereof is a circular shape generally matching the opening of the sensor containing portion 63 (the second cylindrical portion 632) on the X-axis positive direction side. An axis 110 of the main body portion 720 passing through a center of the above-described circle is offset and in parallel with the axis 100 of the cylindrical portion 71. As illustrated in FIG. 7, a straight line 120 extends perpendicularly to a straight light passing through the axis 100 and the axis 110 and passes through the axis 100 when the cover member 7 is viewed from the x-axis direction. This straight line 120 is defined to be an imaginary line. The imaginary line 120 extends perpendicularly to the axis 100. A length of the main body portion 720 in a radial direction with respect to the axis 100 is longer in a region 130 than in a region 140 as viewed from the x-axis direction. The region 130 and the region 140 are located on one side and the other side of the imaginary line 120, respectively. A thickness (a dimension in the x-axis direction) of the main body portion 720 is generally even (except for the rib portions 74 and 75 and the like). A dimension (a thickness) of the main body portion 720 is smaller than a dimension (an axial length) of the first bearing 81 (the outer race 813) in the x-axis direction. As illustrated in FIG. 9, the sleeve member 80 is located at a position that overlaps the main body portion 720 in the x-axis direction. The main body portion 720 is located at an intermediate portion of the sleeve member 80 in the x-axis direction. In other words, the main body portion 720 entirely overlaps the sleeve member 80 in the x-axis direction. The sleeve member 80 protrudes from the main body portion 720 to both the sides in the x-axis direction. The first bearing 81 (the outer race 813) is located at a position that overlaps the main body portion 720 in the x-axis direction. The main body portion 720 is located at an intermediate portion of the first bearing 81 in the x-axis direction. In other words, the main body portion 720 entirely overlaps the first bearing 81 in the x-axis direction. That is, the above-described intermediate portion of the first bearing 81 means a portion of the first bearing 81 between both ends in the x-axis direction. The first bearing 81 protrudes from the main body portion 720 to both the sides in the x-axis direction.

The cylindrical portion 71 includes a taper portion 713 on an x-axis negative direction side with respect to the main body portion 720. The taper portion 713 is located at a portion of the cylindrical portion 71 that protrudes from a connection portion with the main body portion 720 to the x-axis negative direction side, and is such a portion that an outer diameter thereof in the radial direction with respect to the axis 100 (a diameter of an outer peripheral surface thereof) gradually reduces from the x-axis positive direction side (the main body portion 720 side) toward the x-axis negative direction side (a distal end side). The first bearing 81 and the sleeve member 80 overlap the taper portion 713 in the x-axis direction. More specifically, the taper portion 713 extends to an end of the cylindrical portion 71 in the x-axis negative direction. An end of the sleeve member 80 in the x-axis negative direction generally coincides with the end of the cylindrical portion 71 in the x-axis negative direction.

The connection portion 721 includes a surface 722, screw mounting portions 723 to 725, and a second cylindrical portion 726. The surface 722 is a surface of an x-axis negative direction side of an outer peripheral side of the flange portion 72, and surrounds the main body portion 720 and extends perpendicularly to the x axis. A shape of the surface 722 generally matches a shape of the surface 640 of the connection portion 64 of the sensor containing portion 63. The screw mounting portions 723 to 725 each include a portion protruding from an outer periphery of the flange portion 72 radially outward. The three screw mounting portions 723 to 725 are provided at generally even intervals in a circumferential direction around the axis 110, and include the first mounting portion 723, the second mounting portion 724, and the third mounting portion 725. As illustrated in FIG. 5, each of the mounting portions 723 to 725 include a washer 77 made from a metallic material. The washer 77 is cylindrical, and extends in the x-axis direction. A dimension of the washer 77 in the x-axis direction is larger than a thickness (a dimension in the x-axis direction) of each of the resin mounting portions 723 to 725. An end surface of the washer 77 in the x-axis positive direction protrudes from a surface of each of the resin mounting portions 723 to 725 on the x-axis positive direction side to the x-axis positive direction side. An end surface of the washer 77 in the x-axis negative direction is located on the same plane as the surface 722 of each of the resin mounting portions 723 to 725 on the x-axis negative direction side or protrudes from this surface 722 to the x-axis negative direction side. An outer periphery of the washer 77 is fixed to each of the resin mounting portions 723 to 725 in an entire range in a circumferential direction around an axis of the washer 77. The axis of the washer 77 of each of the first mounting portion 723 and the second mounting portion 724 is located in the region 130 on the one side of the imaginary line 120. The axis of the washer 77 of the third mounting portion 725 is located in the region 140 on the other side of the imaginary line 120.

Figure 4:
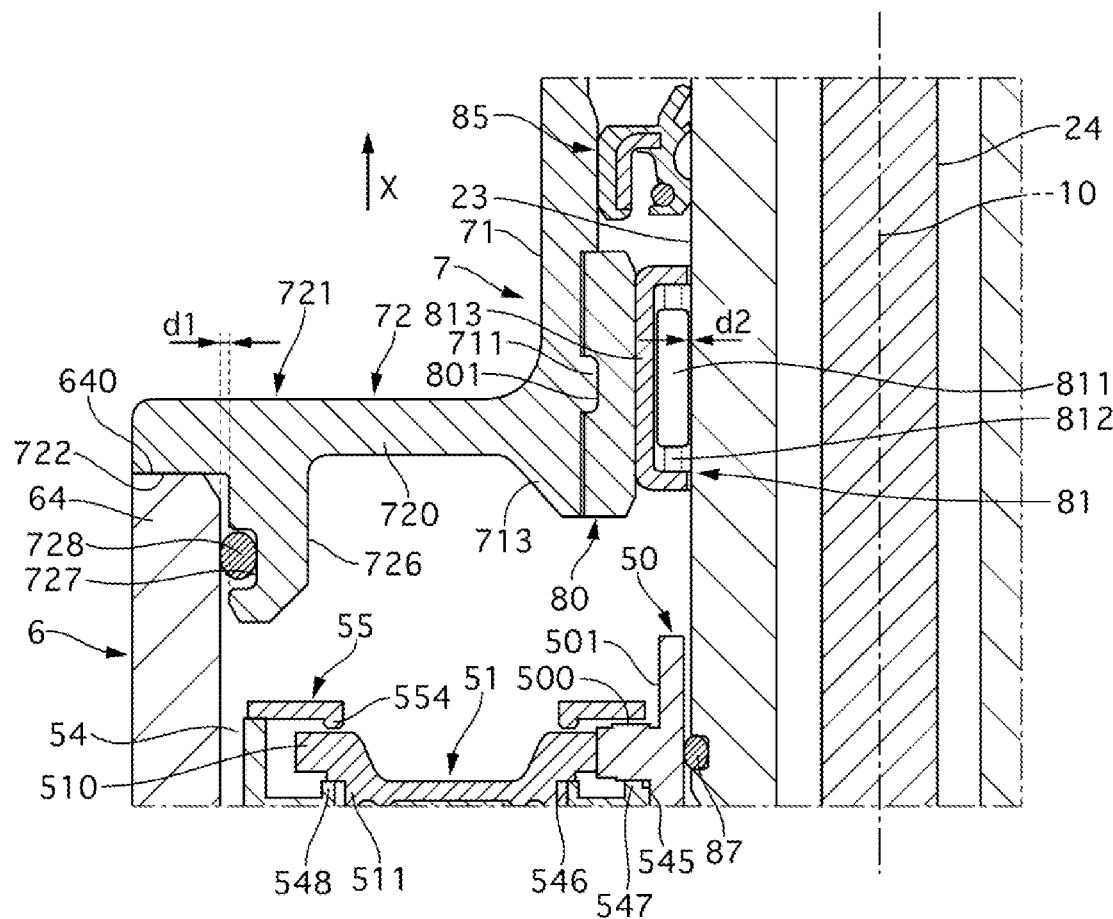
FIG. 4 is an enlarged view of a part of FIG. 3.

The second cylindrical portion 726 is cylindrical, and extends from an outer periphery of the main body portion 720 to the x-axis negative direction side. A groove 727 extending in the circumferential direction around the axis 110 is provided on an outer periphery of the second cylindrical portion 726. A radius R2 (refer to FIG. 9) of an outer peripheral surface of the second cylindrical portion 726 is slightly smaller than a radius R1 (refer to FIG. 3) of an inner peripheral surface (the second cylindrical portion 632) extending in the x-axis direction on the opening side of the sensor containing portion 63. As illustrated in FIG. 4, a difference d1 between R1 and R2 (=R1−R2) is larger than a distance d2 between the outer peripheral surface of the steering shaft 23 and the rolling members 811 (d1>d2). The protrusion portion 73 is a plate-like portion protruding from the flange portion 72 (the main body portion 720) or the cylindrical portion 71 to the x-axis negative direction side. An end surface of the protrusion portion 73 in the x-axis negative direction extends perpendicularly to the x axis.

The first rib portions 74 are provided on the x-axis positive direction side with respect to the flange portion 72, and are a plurality of (twelve) rib portions arranged in the circumferential direction around the axis 100. The second rib portions 75 are provided on the x-axis negative direction side with respect to the flange portion 72, and are a plurality of (twelve) rib portions arranged in the circumferential direction around the axis 100. The rib portions 74 and 75 extend in the radial direction with respect to the axis 100. The first rib portions 74 extend in the x-axis direction along the outer peripheral surface of the cylindrical portion 71 and are connected to the outer peripheral surface of the cylindrical portion 71, and also extend radially along the surface of the main body portion 720 on the x-axis positive direction side and are connected to this surface. The second rib portions 75 extend from an end of the main body portion 720 on a radially inner side (the cylindrical portion 71) to an end of the main body portion 720 on a radially outer side. In FIG. 7, sinks 750 (which will be described below) are generated at portions on the surface of the flange portion 72 on the x-axis positive direction side that correspond to the second rib portions 75. The first rib portions 74 and the second rib portions 75 are located at positions offset (shifted) from each other in the circumferential direction around the axis 100, and are arranged alternately in the circumferential direction around the axis 100.

As illustrated in FIGS. 7 and 8, the protrusion portion 76 is a plate-like portion extending from the outer peripheral side of the flange portion 72 radially outward. A distal end side of the protrusion portion 76 protrudes radially outward beyond the surface 722 of the connection portion 721, and extends perpendicularly to the x axis. The distal end side of the protrusion portion 76 is located slightly on the x-axis positive direction side with respect to the main body portion 720. A hole 760 is provided on a distal end side of the protrusion portion 76. The hole 760 is shaped in such a manner that two rectangles 761 and 762 intersect each other at a predetermined angle.

In a manufacturing process of the steering apparatus 1, first, an assembly of the steering shaft 23, the torsion bar 24, and the pinion shaft 26, and the housing main body 6 are prepared. An assembly of the third bearing 83, the fourth bearing 84, the steering shaft 23, and the like, the sensor units 4 and 5, the holding plug 67, and the harness 91 are mounted on the housing main body 6 (the gear containing portion 62 and the sensor containing portion 63). Further, the cover member 7 is prepared. The first bearing 81 and the oil seal 85 are press-fitted in the cylindrical portion 71 with the sleeve member 80 formed thereon by insert-molding. The sleeve member 80 is disposed between the cylindrical portion 71 and the first bearing 81. The O-ring 728 is set in the groove 727 of the second cylindrical portion 726. After that, the cover member 7 is mounted on the housing main body 6 (the sensor containing portion 63). The steering shaft 23 penetrates through on the inner peripheral side of the cylindrical portion 71. A lip on the inner periphery of the oil seal 85 is in contact with the outer peripheral surface of the steering shaft 23. As illustrated in FIG. 2, a dust cover 86 is set on the outer periphery of the steering shaft 23, and covers the opening of the cylindrical portion 71 on the x-axis positive direction side. The second cylindrical portion 726 of the cover member 7 is fitted in the opening portion of the sensor containing portion 63 (the second cylindrical portion 632), thereby bringing the surface 640 of the connection portion 64 and the surface 722 of the connection portion 721 into contact with each other. The end of the washer 77 of each of the mounting portions 723 to 725 of the flange portion 72 in the x-axis negative direction is in contact with the surface 640 of the connection portion 64 (each of the mounting portions 641 to 643) of the sensor containing portion 63. The first to third mounting portions 723 to 725 of the cover member 7 are connected to the first to third mounting portions 641 to 643 of the sensor containing portion 63, respectively.

With the cover member 7 mounted on the housing main body 6 in this manner, the axis 100 (the x axis), the axis 110, the region 13, and the region 14 generally coincide with the axis 10 (the X axis), the axis 11, the region 130, and the region 140, respectively. The distal end side of the protrusion 674 of the clamp portion 673 of the holding plug 67 is located inside the hole 760 of the protrusion portion 76 of the cover member 7. The protrusion 674 extends in parallel with a long side of the rectangle 761, which is one of the two rectangles 761 and 762 forming the hold 760. As illustrated in FIG. 3, the end of the protrusion portion 73 of the cover member 7 in the X-axis negative direction faces the surface of the cover 55 of the steering angle sensor unit 5 on the X-axis positive direction side. With the cover 55 in contact with the case 54, a sum of a distance d4 between the main body portion 510 of the first gear 51 and the cover 55 (the protrusion portion 554) and a distance d5 between the cover 55 and the protrusion portion 73 is smaller than a length d6 of the shaft portion 511 of the first gear 51 ((d4+d5)<d6) in the X-axis direction. Similarly, a sum of a distance between the main body portion 520 of the second gear 52 and the cover 55 (the protrusion portion with which the opening of the above-described third hole is edged) and the distance d5 is smaller than a length of the shaft portion 521 of the second gear 52.

After that, a space between the steering shaft 23 (the outer peripheral surface thereof) and the first bearing 81 (the rolling members 811) is adjusted and the axis of the first bearing 81 and the rotational axis of the steering shaft 23 are set to coincide with each other (the axes are centered) by adjusting a position of the cover member 7 relative to the sensor containing portion 63 in the direction perpendicular to the X axis. Now, as illustrated in FIG. 4, the distance d1 between the outer peripheral surface of the second cylindrical portion 726 (except for the groove 727) and the inner peripheral surface of the sensor containing portion 63 (the second cylindrical portion 632) is longer than the distance d2 between the outer peripheral surface of the steering shaft 23 and the rolling members 811 of the first bearing 81 in any radial direction passing through the axis 11. In other words, a relative displacement allowable amount d1 between the cover member 7 and the housing main body 6 in the radial direction with respect to the axis 10 is larger than a dimension d2 of the space between the steering shaft 23 and the first bearing 81.

After that, the flange portion 72 and the connection portion 64 are fastened to each other with use of screws 67. The connection portion 64 of the sensor containing portion 63 is connected to the flange portion 72 (the connection portion 721 thereof). The screws 67 fasten the flange portion 72 and the connection portion 64 to each other. The cover member 7 (the flange portion 72) and the housing main body 6 (the sensor containing portion 63) are integrally fixed to each other with use of the screws 67. The screws 67 function as a fixation tool for fixing the cover member 7 to the housing main body 6. The screws 67 include a first screw 671, a second screw 672, and a third screw 673. The first to third screws 671 to 673 are inserted in the washers 77 of the first to third mounting portions 723 to 725 of the flange portion 72, respectively, and are threadably engaged with the screw holes 644 of the first to third mounting portions 641 to 643 of the connection portion 64 of the sensor containing portion 63, respectively. The first screw 671 and the second screw 672 are located in the region 13 on the one side of the imaginary line 12. The third screw 673 is located in the region 14 on the other side of the imaginary line 12. A head portion 674 of each of the screws 671 to 673 is in contact with the end of the washer 77 in the x-axis positive direction. A space is generated between the head portion 674 of each of the screws 671 to 673 and the flange portion 72 (the resin mounting portions 723 to 725) in the X-axis direction. A diameter of the inner peripheral surface (an inner diameter) of the washer 77 is larger than a diameter of an outer peripheral surface (an outer diameter) of a shaft portion 675 of the screw 67. As illustrated in FIG. 5, a radial space (a clearance) is generated between the shaft portion 675 and the washer 77. A dimension d3 of this space is larger than the dimension d2 of the space between the steering shaft 23 and the first bearing 81 (d3>d2).

[Functions]

Next, functions will be described. The intermediate shaft 21 and the steering shaft 23 are connected to each other via the universal joint 22. Due to a torsional force of the universal joint 22 (including the pinion shaft 26), a couple force is applied to both the ends of the steering shaft 23 in the rotational axial direction. According to the rotation of the steering wheel 200 (the intermediate shaft 21), the rotational axial center of the steering shaft 23 attempts a wobbling rotation relative to a position thereof when being stationary (when the steering wheel 200 is not steered). Hereinafter, this motion will be referred to as a tilt of the steering shaft 23. This motion contains a component in the direction perpendicular to the axis of the sensor containing portion 63 (the radial direction). The steering shaft 23 is supported by the cover member 7 via the first bearing 81. The first bearing 81 rotatably supporting the steering shaft 23 is located on the inner peripheral side of the cylindrical portion 71 of the cover member 7. Due to the tilt of the steering shaft 23, a radial force is applied to the cylindrical portion 71 of the cover member 7 via the first bearing 81. A force is applied from the cylindrical portion 71 to the flange portion 72 (the main body portion 720, the same applies hereinafter). A deformation (deflection) of the flange portion 72, if any, makes it impossible to correctly hold the first bearing 81 on the cover member 7 (the housing), thereby raising a possibility of a reduction in the performance of supporting the steering shaft 23 by the first bearing 81. In the present embodiment, the first bearing 81 is located at the position that overlaps the flange portion 72 in the rotational axial direction of the steering shaft 23 (the X-axis direction). Therefore, an application point at which the force is applied to the flange portion 72 via the first bearing 81 due to the tilt of the steering shaft 23 is positioned on the inner peripheral side of the flange portion 72. Therefore, a force for bending (deflecting) the flange portion 72 (a moment arm) reduces compared to when the above-described application point is located at a position offset from the flange portion 72 in the X-axis direction. As a result, the present configuration prevents or reduces the deflection of the flange portion 72, thereby improving the supporting performance of the first bearing 81. In other words, the present configuration allows the flange portion 72 to reduce in thickness while preventing or reducing the deterioration of the performance of the first bearing 81. Preferably, the dimension (the thickness) of the flange portion 72 in the X-axis direction is thin and even as long as molding requirements are satisfied. As a result, the present configuration can achieve a reduction in the size of the steering apparatus 1 along with achieving a cost reduction by using minimum required materials. In the present embodiment, the dimension (the thickness) of the flange portion 72 is smaller than the dimension of the first bearing 81 in the X-axis direction.

The flange portion 72 does not have to entirely overlap the first bearing 81 in the rotational axial direction of the steering shaft 23 (the X-axis direction). In other words, the flange portion 72 may be disposed in a different manner as long as it partially overlaps the first bearing 81 in the X-axis direction. In the present embodiment, the flange portion 72 is located at the intermediate portion of the first bearing 81 in the X-axis direction (between both the axial ends). Therefore, a central position in the X-axis direction regarding a load that the first bearing 81 receives due to the tilt of the steering shaft 23 (or a load applied from the first bearing 81 to the cover member 7) approaches a central position of the flange portion 72 in the X-axis direction. Therefore, the force for deflecting the flange portion 72 (the moment arm) further reduces, and thus the present configuration can further effectively prevent or reduce the deflection of the flange portion 72. The same also applies to when the dimension (the thickness) of the flange portion 72 is equal to or larger than the dimension of the first bearing 81 in the X-axis direction. With the first bearing 81 located at the intermediate position of the flange portion 72 in the X-axis direction, the central position in the X-axis direction regarding the load applied from the first bearing 81 to the cover member 7 due to the tilt of the steering shaft 23 approaches the central position of the flange portion 72 in the X-axis direction.

The cylindrical portion 71 includes the taper portion 713 configured in such a manner that the outer diameter thereof in the radial direction with respect to the above-described rotational axis gradually reduces from the flange portion 72 side (the X-axis positive direction side) toward the housing main body 6 side (the X-axis negative direction side), at the portion thereof protruding from the flange portion 72 side to the housing main body 6 (the sensor containing portion 63) side in the rotational axial direction of the steering shaft 23 (the X-axis direction). The load can also be applied from the first bearing 81 to the above-described portion. The present configuration can ease concentration of a stress generated on the cylindrical portion 71 due to the above-described load with the aid of the provision of the taper portion 713 configured in the above-described manner at the above-described portion. More specifically, the above-described portion has a smaller cross-sectional area and is more easily deflected as becoming farther away from the base portion of the flange portion 72 (the connection portion between the flange portion 72 and the cylindrical portion 71) (as the moment arm increases). Therefore, the present configuration prevents or reduces application of the above-described load applied to the above-described portion to the base portion of the flange portion 72 as the force for deflecting the flange portion 72 (a bending stress). Due to the gradual reduction in the above-described outer diameter, the present configuration can more effectively prevent or reduce the concentration of the stress. The above-described outer diameter does not have to reduce at a constant rate (linearly) in the X-axis direction, and the above-described outer diameter may reduce at a rate changing in the X-axis direction. The bending stress may be further reduced by further increasing an angle formed between the flange portion 72 and the cylindrical portion 71 at the above-described base portion.

The material of the cover member 7 may be metal. For example, the material of the cover member 7 may be an aluminum metallic material similar to the housing main body 6. In the present embodiment, the main material of the cover member 7 is resin. (At least the main body portion 720 is made from the resin material.) Therefore, the present configuration allows the cover member 7 to have a lighter weight and lower cost compared to when the material of the cover member 7 is metal. However, the employment of the resin as the material of the cover member 7 may reduce stiffness or strength of the flange portion 72. To address this inconvenience, the present configuration prevents or reduces the deflection of the flange portion 72 by setting the relative position between the first bearing 81 and the flange portion 72 in the X-axis direction as described above, therefore can improve the supporting performance of the first bearing 81.

The first bearing 81 supporting the steering shaft 23 may be a sliding bearing. However, in this case, the steering apparatus 1 may be subjected to an increase in friction between the steering shaft 23 and the first bearing 81, ending up deteriorating a steering feeling. Especially, since the assist mechanism 3 is the electric power steering device, the employment of the sliding bearing as the first bearing 81 makes lubrication of the first bearing 81 difficult, thereby easily resulting in the increase in the friction. The first bearing 81 according to the present embodiment is the roller bearing. Therefore, the present configuration can prevent or cut down the increase in the friction, thereby preventing or reducing the deterioration of the steering feeling.

The first bearing 81 may be a ball bearing. The first bearing 81 according to the present embodiment is a cylindrical roller bearing that receives a radial load. The roller bearing can achieve space saving by allowing a reduction in a setting of rattling (a clearance) and also achieve a cost reduction compared to the ball bearing. More specifically, the first bearing 81 is the needle bearing. The needle bearing has a large dimension in the rotational axial direction of the steering shaft 23 (the X-axis direction), and exerts the force on the cover member 7 (the cylindrical portion 71) over a surface large in area. Therefore, the present configuration can prevent or reduce concentration of a surface pressure on the cover member 7 (the cylindrical portion 71). Therefore, the present configuration prevents or reduces deformation of the cover member 7, and therefore can further correctly hold the first bearing 81. Even if the stiffness or the strength of the cover member 7 may reduce due to the employment of the resin as the material of the cover member 7, the present configuration can prevent or reduce the deformation of the cover member 7 and thus improve the supporting performance of the first bearing 81 by using the needle bearing as the first bearing 81. The first bearing 81 includes the outer race 813. Therefore, the present configuration can acquire a stable performance of the first bearing 81 even when the cover member 7 (the cylindrical portion 71) with the first bearing 81 mounted thereon is made from the resin material and has relatively low stiffness or strength. The outer race 813 is shaped like a shell. Therefore, the present configuration can achieve reductions in a weight and cost of the first bearing 81.

The cylindrical sleeve member 80 is provided between the cover member 7 (the cylindrical portion 71) and the first bearing 81. The sleeve member 80 is made from the metallic material. The outer periphery of the outer race 813 is fitted to the inner periphery of the sleeve member 80. The sleeve member 80 functions as a collar member of the first bearing 81, which is the needle bearing, and regulates deformation of the outer race 813 on the outer peripheral side of the first bearing 81. As a result, the present configuration improves circularity of the first bearing 81, which is the needle bearing. Therefore, the present configuration can improve the performance of the first bearing 81.

Due to the tilt of the steering shaft 23, the force is applied to the cover member 7 via the first bearing 81 and the sleeve member 80. The cover member 7 receives the load directly from the sleeve member 80. Therefore, the above description regarding the first bearing 81 also applies to the sleeve member 80. For example, the sleeve member 80 is located at the position that overlaps the flange portion 72 in the rotational axial direction of the steering shaft 23 (the X-axis direction). Therefore, because an application point at which the force is applied to the flange portion 72 via the first bearing 81 and the sleeve member 80 due to the tilt of the steering shaft 23 is positioned on the inner peripheral side of the flange portion 72, the present configuration can improve the supporting performance of the first bearing 81. The flange portion 72 is located at the intermediate portion of the sleeve member 80 in the X-axis direction. Therefore, because a central position in the X-axis direction regarding a load that the sleeve member 80 receives due to the tilt of the steering shaft 23 (or a load applied from the sleeve member 80 to the cover member 7) approaches the central position of the flange portion 72 in the X-axis direction, the present configuration can further effectively prevent or reduce the deflection of the flange portion 72

The length of the sleeve member 80 in the above-described rotational axial direction (the X-axis direction) is longer than the length of the first bearing 81 (the outer race 813, the same also applies hereinafter) in the X-axis direction. This means that the cover member 7 (the cylindrical portion 71) receives the surface pressure from the sleeve member 80 longer (larger in area) than the first bearing 81, and therefore the present configuration can further prevent or reduce concentration of the surface pressure on the cover member 7 (the cylindrical portion 71). The first bearing 81 is located at the intermediate portion of the sleeve member 80 in the X-axis direction. Therefore, the present configuration can prevent or reduce the deformation of the outer race 813 in the entire range in the X-axis direction, thereby further improving the circularity of the first bearing 81.

The first groove 801 extending in the circumferential direction around the above-described rotational axis 10 is provided on the outer peripheral side of the sleeve member 80. The first protrusion 711 (the protrusion portion) protruding from the inner peripheral surface of the cylindrical portion 71 is fitted in the first groove 801. As a result, the present configuration prevents or reduces a movement (a displacement) of the sleeve member 80 relative to the cover member 7 in the above-described rotational axial direction (the X-axis direction), and therefore can improve strength of holding the sleeve member 80 to the cover member 7. The first groove 801 is not limited to one groove, and a plurality of first grooves 801 may be provided in the X-axis direction. Further, the first groove 801 may extend partially in the circumferential direction around the rotational axis 10 on the outer periphery of the sleeve member 80. The second grooves 802 extending in the above-described rotational axial direction (the X-axis direction) are provided on the outer peripheral side of the sleeve member 80. The second protrusions 712 (the protrusion portions) protruding from the inner peripheral surface of the cylindrical portion 71 are fitted in the second grooves 802. As a result, the present configuration prevents or reduces a movement (a displacement) of the sleeve member 80 relative to the cover member 7 in the circumferential direction around the rotational axis 10, and therefore can improve the strength of holding the sleeve member 80 to the cover member 7. The second grooves 802 are not limited to the plurality of second grooves 802, and one second groove 802 may be provided. Further, the second grooves 802 may extend partially in the X-axis direction on the outer periphery of the sleeve member 80. Further, the sleeve member 80 may be mounted on the cover member 7 after the cover member 7 is formed. For example, the sleeve member 80 may be fixed to the cylindrical portion 71 after the cover member 7 is formed by injection molding with use of a resin material. In the present embodiment, the sleeve member 80 is fixed to the cover member 7 (the cylindrical portion 71) by the insert-molding. Therefore, the protrusions 711 and 712 (the protrusion portions) of the cover member 7 in a state fitted in the grooves 801 and 802 of the sleeve member 80 can be formed at the same time as the insert-molding (the formation of the cover member 7 with the sleeve member 80 fixed thereto). Further, the present configuration can enhance a degree of close contact between the grooves 801 and 802 and the protrusions 711 and 712. Therefore, the present configuration can stably improve the performance of the first bearing 81 while reducing the manufacturing cost.

The cover member 7 includes the rib portions 74 and 75. As a result, the present configuration prevents or reduces the deflection of the flange portion 72, thereby improving the supporting performance of the first bearing 81. Even when the cover member 7 is made from the resin material, the deflection of the flange portion 72 can be prevented or reduced. The cover member 7 includes the first rib portions 74 and the second rib portions 75. The first rib portions 74 are located on the one side (the X-axis positive direction side) of the flange portion 72 in the rotational axial direction of the steering shaft 23, and the second rib portions 75 are located on the other side (the X-axis negative direction side) of the flange portion 72 in the above-described rotational axial direction. In this manner, the present configuration can further effectively prevent or reduce the deflection of the flange portion 72 due to the provision of the rib portions on both the side surfaces of the flange portion 72. The pluralities of rib portions 74 and 75 are provided in the circumferential direction around the above-described rotational axis 10. Therefore, regardless of the position in the circumferential direction around the rotational axis 10 at which the force is applied from the first bearing 81 to the cover member 7 due to the tilt of the steering shaft 23, this force can be received by the rib portions 74 and 75. The rib portions 74 and 75 extend in the radial direction with respect to the rotational axis 10. Therefore, the present configuration can efficiently receive the force applied from the first bearing 81 to the cover member 7 due to the tilt of the steering shaft 23. The first rib portions 74 extend in the X-axis direction along the outer peripheral surface of the cylindrical portion 71 and are connected to the outer peripheral surface of the cylindrical portion 71, and also extend radially along the surface of the main body portion 72 on the X-axis positive direction side and are connected to this surface. In this manner, due to the provision of the first rib portions 74 connected to both the cylindrical portion 71 and the flange portion 72 on the X-axis positive direction side where the axial dimension of the cylindrical portion 71 protruding beyond the flange portion 72 is relatively large, the present configuration can effectively prevent or reduce a tilt of the cylindrical portion 71 with respect to the flange portion 72 and a deformation of the cylindrical portion 71. Therefore, the present configuration can improve the supporting performance of the first bearing 81. The second rib portions 75 extend from the end of the flange portion 72 (the main body portion 720) on the radially inner side (the cylindrical portion 71) to the end thereof on the radially outer side. Therefore, the present configuration can further effectively prevent or reduce the deflection of the flange portion 72. A partial difference in a thickness of a member made from resin, if any, causes a thick portion to be further largely constricted when the resin is cooled and cured at the time of the molding. A recessed portion generated due to this constriction is called a sink. If the first rib portions 74 and the second rib portions 75 are located at the positions that overlap each other in the circumferential direction around the rotational axis 10, the cover member 7 might be extremely thicker in the X-axis direction on the rib portions than on the other portion, and thus have a considerable sink. In the present embodiment, the first rib portions 74 and the second rib portions 75 are located at the positions offset from each other in the circumferential direction around the rotational axis 10. Due to the provision of the first rib portions 74 and the second rib portions 75 at the positions offset from each other in this manner, the present configuration can prevent or cut down the extreme increase in the thicknesses of the portions corresponding to the rib portions (a variation in the thickness of the cover member 7, thereby preventing or reducing the generation of the sink.

The fixation tool for fixing the cover member 7 and the sensor containing portion 63 to each other is not limited to the screw, and may be a stud, a bolt, or the like. In the present embodiment, the screws 67 fasten the flange portion 72 and the connection portion 64 to each other. The flange portion 72 includes the cylindrical washer 77 in which each of the screws 67 is inserted. The washer 77 is made from a metallic material. A fastening force (an axial force) of the screw 67 is mainly applied to the washer 77. Therefore, even when the flange portion 72 is made from the resin material, the present configuration prevents or reduces a deformation (a creep) of the flange portion 72 (the resin portion, the same also applies hereinafter) due to the above-described fastening force. Therefore, the present configuration can further reliably prevent or reduce the deflection of the flange portion 72. The axial dimension of the washer 77 is larger than the thickness of the flange portion 72. The end surface of the washer 77 in the axial direction is located on the same plane as the surface of the flange portion 72 or protrudes from the surface of the flange portion 72. Therefore, the present configuration prevents or reduces application of the axial force that the head portion 674 of the screw 67 or the connection portion 64 of the sensor containing portion 63 facing the surface of the flange portion 72 would exert by directly hitting the surface of the flange portion 72. Therefore, the present configuration can further reliably prevent or reduce the deformation of the flange portion 72 due to the above-described fastening force. In the present embodiment, the axial space is generated between the head portion 674 of the screw 67 and the flange portion 72. As described above, the application point of the force applied to the flange portion 72 due to the tilt of the steering shaft 23 is located on the inner peripheral side of the flange portion 72, and this leads to a reduction in the force for bending the flange portion 72. Therefore, the force applied from the flange portion 72 to the washer 77 is applied basically in the radial direction with respect to the above-described rotational axis (the direction perpendicular to the outer peripheral surface of the washer 77). Therefore, the present configuration allows a surface pressure to reduce on the portion of the flange portion 72 that faces the washer 77 in the above-described radial direction, and therefore can further reliably prevent or reduce the deformation of the flange portion 72. The outer periphery of the washer 77 is fixed to the flange portion 72 in the entire circumferential range. Therefore, the present configuration prevents or reduces the concentration of the surface pressure on the flange portion 72 regardless of the direction (in the above-described radial direction) in which the force is applied from the flange portion 72 to the washer 77 due to the tilt of the steering shaft 23, and therefore can further reliably prevent or reduce the deformation of the flange portion 72. The diameter of the inner peripheral surface (the inner diameter) of the washer 77 is larger than the diameter of the outer peripheral surface (the outer diameter) of the shaft portion 675 of the screw 67. The radial space (the clearance) is generated between the shaft portion 67 and the washer 77. The radial dimension d3 of this space is larger than the radial dimension d2 of the space between the steering shaft 23 and the first bearing 81. Therefore, when the steering apparatus 1 is manufactured, even when the space between the steering shaft 23 and the firs bearing 81 is adjusted (the axes thereof are centered) before the flange portion 72 and the connection portion 64 are fastened to each other with use of the screws 67, the present configuration can ensure that the radial space is generated between the screw 67 and the washer 77, thereby facilitating the tightening of the screw 67.

As illustrated in FIG. 4, in the state before the flange portion 72 and the connection portion 64 are fastened to each other with use of the screws 67, the relative displacement allowable amount d1 between the cover member 7 and the housing main body 6 in the radial direction with respect to the rotational axis 10 is larger than the dimension d2 of the space between the steering shaft 23 and the first bearing 81. Therefore, when the steering apparatus 1 is manufactured, the space can be adjusted between the steering shaft 23 and the first bearing 81 (the axes thereof can be centered) regardless of the radial space between the cover member 7 and the housing main body 6 before the above-described fastening using the screws 67. In other words, even when the above-described centering of the axes is carried out, the present configuration can establish the connection between the cover member 7 and the housing main body 6 while ensuring that the radial space is generated between the cover member 7 and the housing main body 6. Even if the above-described radial space varies depending on a portion in the circumferential direction around the rotational axis 10 due to the above-described centering of the axes, the O-ring 728 maintains the close contact state while being elastically deformed, and therefore the sealability therebetween is secured.

The steering angle sensor unit 5 includes the input gear 50 provided on the outer periphery of the steering shaft 23, the first gear 51 meshed with the input gear 50, the second gear 52 meshed with the first gear 51, the first rotational sensor 53 that detects the rotational angle of the first gear 51, and the second rotational sensor that detects the rotational angle of the second gear 52. In the sensor in which the input gear 50, the first gear 51, and the second gear 52 are meshed in series in this manner, a space required in the radial direction with respect to the above-described rotational axis 10 is highly likely distributed unevenly in the circumferential direction around the steering shaft 23. On the other hand, on the cover member 7, the axis 100 of the cylindrical portion 71 and the axis 110 of the flange portion 72 do not coincide with each other and are offset from each other. The length of the flange portion 72 in the radial direction with respect to the axis 100 is longer on the one side of the imaginary line 120 (the region 130) than on the other side of the imaginary line 120 (the region 140). This means that the space in the sensor containing portion 63 (covered by the flange portion 72) in the radial direction with respect to the rotational axis 10 of the steering shaft 23 is larger in the one side of the imaginary line 12 (the region 13) than in the other side (the region 14) of the imaginary line 12. Therefore, the present configuration improves layout flexibility when mounting the steering angle sensor unit 5 (the required radial space is highly likely unevenly distributed in the circumferential direction around the steering shaft 23) in the sensor containing portion 63. As a result, the present configuration can achieve a reduction in the radial size of the sensor containing portion 63. In the present embodiment, the steering angle sensor unit 5 includes the connector 90 connected to the terminals of the first rotational sensor 53 and the second rotational sensor. The connector 90 is located on the one side (the region 13) of the imaginary line 12. A space for the connector 90 and the harness 91 connected thereto should be prepared in the sensor containing portion 63, and the above-described space can be easily prepared by disposing the connector 90 in the region 13. More specifically, the connector 90 is the substrate-to-wire connector, and is disposed on the same sensor substrate 9 as the rotational sensor 53 and the like. Therefore, the present configuration can improve layout flexibility of the sensor substrate 9, which extends in the radial direction with respect to the above-described rotational axis 10, in the sensor containing portion 63. The rotational axis of the second gear 52 and the connector 90 are located on the one side (the region 13) of the imaginary line 12. The present configuration can efficiently utilize the radial space of the sensor containing portion 63 and thus achieve the reduction in the radial size of the sensor containing portion 63 by disposing the connector 90 and a part of the gears in the region 13 having a relatively large space in the radial direction with respect to the above-described rotational axis 10. The rotational axes of both the first gear 51 and the second gear 52 may be located in the region 13. In this case, the space that contains the first gear 51 and the second gear 52 can be easily prepared in the sensor containing portion 63.

The one side (the region 13) of the imaginary line 12 contains a long length of the flange portion 72 in the radial direction with respect to the above-described rotational axis 10, and therefore likely has low stiffness. To address this inconvenience, the present configuration can balance the stiffness of the entire cover member 7 by including a larger number of portions that support the flange portion 72 on the one side (the region 13) of the imaginary line 12 than on the other side (the region 14). In the present embodiment, the screws 67 include the first screw 671, the second screw 672, and the third screw 673. The first screw 671 and the second screw 672 are located in the region 13, and the third screw 673 is located in the region 14. In this manner, a larger number of screws 67 (a larger number of supporting portions) are provided on the one side of the imaginary line 12 than on the other side of the imaginary line 12. The number of screws 67 (the number of supporting portions) is not limited to three.

The sensor substrate 9 is sandwiched between the steering angle sensor unit 5 and the steering torque sensor unit 4 in the X-axis direction. Therefore, the present configuration can simplify an electric connection structure between each of the units and the sensor substrate 9 while allowing the sensor substrate 9 to be shared between the steering angle sensor unit 5 and the steering torque sensor unit 4. The steering angle sensor unit 5 includes the case 54 having the space 544 containing the first gear 51 and the second gear 52. The case 54 has a partially cutout shape without entirely covering the opening portion of the sensor containing portion 63. As viewed from the X-axis direction, the portion of the sensor substrate 9 where the connector 90 is mounted is located in the region 15 surrounded by the outer periphery of the case 54 and the inner periphery of the sensor containing portion 63. Further, the hole 634 is opened to the region 15. Therefore, even without the case 54 removed with the cover member 7 detached from the sensor containing portion 63, the harness 91 can be easily connected to the connector 90 and the harness 91 can be easily disconnected from the connector 90. Further, the present configuration facilitates installation of the harness 91, such as guiding the harness 91 protruding from the hole 634 into the sensor containing portion 63 to the connector 90 side.

When the claw 676 of the holding plug 67 and the step 635 are disengaged and the holding plug 67 is moved in a direction for causing the plug member 672 to be pulled out from the hole 634, the protrusion 674 is engaged with the inner periphery of the hole 760 (the long side of the rectangle 761, which is one of the two rectangles 761 and 762 forming the hole 760) of the cover member 7 (the protrusion portion 76). As a result, the present configuration prevents or reduces detachment of the holding plug 67 from the sensor containing portion 63, and disconnection of the harness 91 from the steering apparatus 1. Even when the claw 676 and the step 635 are disengaged from each other, the above-described seal function by the O-ring 677 is secured. The present configuration allows the long side of any of the rectangles 761 and 762 to be used for the above-described engagement even when the steering apparatus 1 is mounted on a different type of vehicle by forming the hole 760 by the two rectangles 761 and 762.

The first gear 51 includes the shaft portion 511 extending to the one side of the first gear 51 in the rotational axial direction (the X-axis negative direction side). The shaft portion 511 is fitted in the case 54. The steering angle sensor unit 5 includes the cover 55 that closes the opening of the containing space 544 of the case 54. The other side of the first gear 51 in the rotational axial direction (the X-axis positive direction side) faces the cover 55 (the protrusion portion 554). The cover 55 contacts the case 54 due to its own weight and closes the opening of the containing space 544, thereby allowing the first gear 51 to be contained in the containing space 544. The sensor substrate 9 is located on the opposite side of the case 54 and the cover 55 from the opening portion of the sensor containing portion 63 (the cover member 7) in the rotational axial direction of the steering shaft 23 (the X-axis direction). The sensor substrate 9 does not face the cover 55 in the X-axis direction. On the other hand, the pin 549 only regulates the movement of the cover 55 relative to the case 54 within the plane perpendicular to the above-described rotational axis 10 and does not regulate its movement in the X-axis direction. Therefore, the cover 55 can be separated from the case 54 and moved toward the opening portion side of the sensor containing portion 63 (the X-axis positive direction side) in the X-axis direction. A movement of the cover 55 by a predetermined distance or longer, if any, may cause a release of the fitted engagement between the shaft portion 511 of the first gear 51 and the case 54 and thus detachment of the first gear 51. To address this inconvenience, the cover member 7 includes the protrusion portion 73. The protrusion portion 73 protrudes beyond the flange portion 72 to the housing main body 6 side, and faces the cover 55. The sum of the distance d4 between the first gear 51 (the main body portion 510) and the cover 55 (the protrusion portion 554) and the distance d5 between the cover 55 and the protrusion portion 73 is smaller than the length d6 of the shaft portion 511 of the first gear 51 in the rotational axial direction of the first gear 51. In other words, a maximum distance by which the first gear 51 (the shaft portion 511) can be moved relative to the case 54 in the rotational axial direction is shorter than the length of the shaft portion 511 fitted in the case 54. Even when the cover 55 is separated from the case 54, the movement of the cover 55 is regulated by the protrusion portion 73 (the cover member 7). At this time, since the distance between the cover 55 (separated from the case 54) and the firs gear 51 (the main body portion 510) is shorter than the length of the shaft portion 511 of the first gear 51, a failure to fit the shaft portion 511 in the case 54 is prevented or reduced. As a result, the detachment of the first gear 51 is prevented or reduced. The same also applies to the second gear 52.

[Second Embodiment]

Figure 12:
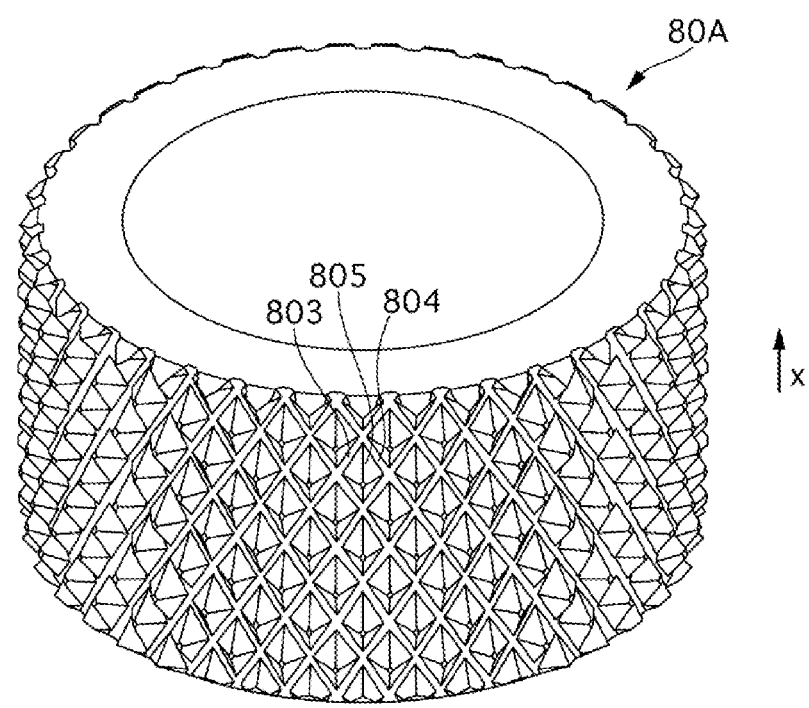
FIG. 12 is a perspective view of a sleeve member according to a second embodiment.

First, a configuration will be described. As illustrated in FIG. 12, grooves extending in the circumferential direction around the rotational axis and in the rotational axial direction of the steering shaft 23 (the X-axis direction and the x-axis direction) are provided on an outer peripheral side of a sleeve member 80A. The grooves include first grooves 803 and second grooves 804. The first grooves 803 extend linearly while tilting to one side with respect to the above-described rotational axis (tilting in the above-described circumferential direction around the rotational axial and the above-described rotational axial direction). The first grooves 803 each has a V-like shape. The first grooves 803 are a plurality of grooves arranged in the circumferential direction around the rotational axis (or the above-described rotational axial direction). The second grooves 804 extend linearly while tilting to the other side with respect to the rotational axis (tilting in the above-described circumferential direction around the rotational axial and the above-described rotational axial direction). The second grooves 804 each has a V-like shape. The second grooves 804 are a plurality of grooves arranged in the circumferential direction around the rotational axis (or the above-described rotational axial direction). The first grooves 803 and the second grooves 804 intersect with each other. The sleeve member 80A includes a plurality of protrusions 805 each shaped like a quadrilateral pyramid shape, which is sandwiched between the first grooves 803 and the second grooves 804. The protrusions 805 are regularly arranged. The first grooves 803 and the second grooves 804 (the protrusions 805) are provided in an entire axial range of the sleeve member 80A. Protrusions and grooves shaped in conformity with (fittable in) the grooves 803 and 804 (the protrusions 805) are formed on the inner peripheral surface of the cylindrical portion 71 by forming the sleeve member 80A by insert-molding. The other configuration is similar to the first embodiment.

Next, functions will be described. The above-described protrusions (protrusion portions) protruding from the inner peripheral surface of the cylindrical portion 71 are fitted in the first grooves 803 and the second grooves 804. In other words, the protrusions 805 of the sleeve member 80A are fitted in the above-described grooves (recessed portions) on the inner peripheral surface of the cylindrical portion 71. As a result, the present configuration prevents or reduces a movement (a displacement) of the sleeve member 80A relative to the cover member 7 in the circumferential direction around the rotational axis and in the above-described rotational axial direction. The other functions and effects are similar to the first embodiment.

[Other Embodiments]

Having described the present invention based on the embodiments thereof, the specific configuration of the present invention is not limited to the embodiments. The present invention also includes a design modification and the like thereof made within a range that does not depart from the spirit of the present invention, if any. For example, the specific configuration of the steering apparatus is not limited to the embodiments, and can be modified as needed. The steering mechanism is not limited to the rack and pinion. For example, the power steering apparatus is not limited to the rack assist-type steering apparatus and may be a pinion assist-type steering apparatus.

[Technical Ideas Recognizable From Embodiments]

Technical ideas (or technical solutions, the same applies hereinafter) recognizable from the above-described embodiments will be described below.

(1) A steering apparatus according to the present technical idea, in one configuration thereof, includes a steering mechanism including a steering shaft configured to rotate according to a rotation of a steering wheel and a transmission mechanism configured to turn a turning target wheel according to the rotation of the steering shaft, a first housing member located on one side in a rotational axial direction of the steering shaft and including a cylindrical portion surrounding the steering shaft and a flange portion extending in a radial direction with respect to a rotational axis of the steering shaft to an outer side of the cylindrical portion in the radial direction, a second housing located on the other side in the rotational axial direction, including a connection portion connected to the flange portion of the first housing member and a containing portion containing a part of the steering shaft, and forming a housing together with the first housing member, and a bearing provided at a position that overlaps the flange portion in the rotational axial direction on an inner peripheral side of the cylindrical portion of the first housing member and configured to support the steering shaft.

(2) According to a further preferable configuration, in the above-described configuration, a material of the first housing member includes resin.

(3) According to another preferable configuration, in any of the above-described configurations, the bearing is a needle bearing.

(4) According to further another preferable configuration, any of the above-described configurations further includes a cylindrical sleeve member between the first housing member and the bearing. A material of the sleeve member includes metal.

(5) According to further another preferable configuration, in any of the above-described configurations, a length of the sleeve member in the rotational axial direction is longer than a length of the bearing in the rotational axial direction.

(6) According to further another preferable configuration, in any of the above-described configurations, the flange portion is provided at an intermediate portion of the sleeve member in the rotational axial direction.

(7) According to further another preferable configuration, in any of the above-described configurations, the cylindrical portion is configured in such a manner that an outer diameter thereof in the radial direction with respect to the rotational axial direction gradually reduces from the flange portion side toward the second housing side in a portion protruding from the flange portion side to the second housing side in the rotational axial direction.

(8) According to further another preferable configuration, in any of the above-described configurations, a groove extending in a circumferential direction around the rotational axis is provided on an outer peripheral side of the sleeve member, and the sleeve member is fixed to the first housing member by inert-molding.

(9) According to further another preferable configuration, in any of the above-described configurations, a groove extending in the rotational axial direction is provided on an outer peripheral side of the sleeve member, and the sleeve member is fixed to the first housing member by inert-molding.

(10) According to further another preferable configuration, any of the above-described configurations further includes a screw configured to fasten the flange portion and the connection portion to each other. The flange portion includes a cylindrical washer in which the screw is inserted, and a material of the washer includes metal.

(11) According to further another preferable configuration, any of the above-described configurations further includes a sensor unit provided in the housing and configured to detect a steering angle that is a rotational angle of the steering shaft. This sensor unit includes a first gear provided on an outer periphery of the steering shaft, a second gear meshed with the first gear, a third gear including teeth, the number of which is not dividable by the number of teeth of the second gear, and meshed with the second gear, a first rotational sensor configured to detect a rotational angle of the second gear, a second rotational sensor configured to detect a rotational angle of the third gear, and a connector connected to a terminal of each of the first rotational sensor and the second rotational sensor. The connector is provided on one side of an imaginary line perpendicular to the rotational axis of the steering shaft. A length of the flange portion in the radial direction with respect to the rotational axis of the steering shaft is longer on the one side of the imaginary line than on the other side of the imaginary line.

(12) According to further another preferable configuration, in any of the above-described configurations, the second gear includes a shaft portion extending to one side of the second gear in the rotational axial direction. The third gear includes a shaft portion extending to one side of the third gear in the rotational axial direction. The sensor unit includes a case having a containing space containing the second gear and the third gear and a cover closing an opening of the containing space. The shaft portion of the second gear and the shaft portion of the third gear are fitted in the case. The other sides of the second gear and the third gear in the rotational axial direction face the cover. The first housing member includes a protrusion portion protruding beyond the flange portion toward the second housing side in the rotational axial direction of the steering shaft. The protrusion portion faces the cover. A sum of a distance between the second gear and the cover and a distance between the cover and the protrusion portion is smaller than a length of the shaft portion of the second gear in the rotational axial direction of the second gear. A sum of a distance between the third gear and the cover and the distance between the cover and the protrusion portion is smaller than a length of the shaft portion of the third gear in the rotational axial direction of the third gear.

(13) According to further another preferable configuration, any of the above-described configurations further includes a first screw, a second screw, and a third screw that fasten the flange portion and the connection portion to each other. The first screw and the second screw are located on the one side of the imaginary line. The third screw is located on the other side of the imaginary line.

(14) According to further another preferable configuration, in any of the above-described configurations, the first housing includes a plurality of first rib portions located on one side of the flange portion in the rotational axial direction and arranged in a circumferential direction around the rotational axis, and a plurality of second rib portions located on the other side of the flange portion in the rotational axial direction and arranged in the circumferential direction around the rotational axis. The first rib portions and the second rib portions are provided at positions offset from each other in the circumferential direction around the rotational axis.

(15) According to further another preferable configuration, any of the above-described configurations further includes a screw configured to fasten the flange portion and the connection portion to each other. In a state before the flange portion and the connection portion are fastened to each other with use of the screw, a relative displacement allowable amount between the first housing member and the second housing member in the radial direction with respect to the rotational axis is larger than a dimension of a space between the steering shaft and the first bearing.

Having described merely several embodiments of the present invention, it is apparent to those skilled in the art that the embodiments described as the examples can be modified or improved in various manners without substantially departing from the novel teachings and advantages of the present invention. Therefore, such a modified or improved embodiment is intended to be also contained in the technical scope of the present invention. The above-described embodiments may also be arbitrarily combined.

The present application claims priority under the Paris Convention to Japanese Patent Application No. 2016-182681 filed on Sep. 20, 2016. The entire disclosure of Japanese Patent Application No. 2016-182681 filed on Sep. 20, 2016 including the specification, the claims, the drawings, and the abstract is incorporated herein by reference in its entirety.

REFERENCE SIGN LIST 1 steering apparatus
200 steering wheel
201 turning target wheel
2 steering mechanism
23 steering shaft
25 transmission mechanism
6 housing main body (second housing member)
63 sensor containing portion
64 connection portion
7 cover member (first housing member)
71 cylindrical portion
72 flange portion
81 first bearing

The invention claimed is:

1. A steering apparatus comprising:
a steering mechanism including a steering shaft configured to rotate according to a rotation of a steering wheel, and a transmission mechanism configured to turn a turning target wheel according to the rotation of the steering shaft;
a first housing member located on one side in a rotational axial direction of the steering shaft, the first housing member including a cylindrical portion surrounding the steering shaft and a flange portion extending in a radial direction with respect to a rotational axis of the steering shaft to an outer side of the cylindrical portion in the radial direction;
a second housing member located on an other side in the rotational axial direction, the second housing member including a connection portion connected to the flange portion of the first housing member and a containing portion containing a part of the steering shaft, the second housing member forming a housing together with the first housing member;
a bearing provided at a position that overlaps the flange portion in the rotational axial direction on an inner peripheral side of the cylindrical portion of the first housing member, the bearing being configured to support the steering shaft; and
a cylindrical sleeve member between the first housing member and the bearing,
wherein a material of the first housing member includes resin,
wherein the bearing is a needle bearing,
wherein a material of the sleeve member includes metal, and
wherein a length of the sleeve member in the rotational axial direction is longer than a length of the bearing in the rotational axial direction.

2. The steering apparatus according to claim 1, wherein the flange portion is provided at an intermediate portion of the sleeve member in the rotational axial direction.

3. The steering apparatus according to claim 2, wherein the cylindrical portion is configured in such a manner that an outer diameter thereof in the radial direction with respect to the rotational axial direction gradually reduces from a flange portion side toward a second housing side in a portion protruding from the flange portion side to the second housing side in the rotational axial direction.

4. The steering apparatus according to claim 1, wherein a groove extending in a circumferential direction around the rotational axis is provided on an outer peripheral side of the sleeve member, and the sleeve member is fixed to the first housing member by inert-molding.

5. The steering apparatus according to claim 1, wherein a groove extending in the rotational axial direction is provided on an outer peripheral side of the sleeve member, and the sleeve member is fixed to the first housing member by inert-molding.

6. The steering apparatus according to claim 1, further comprising a screw configured to fasten the flange portion and the connection portion to each other,
wherein the flange portion includes a cylindrical washer in which the screw is inserted, and a material of the washer includes metal.

7. A steering apparatus comprising:
a steering mechanism including a steering shaft configured to rotate according to a rotation of a steering wheel, and a transmission mechanism configured to turn a turning target wheel according to the rotation of the steering shaft;
a first housing member located on one side in a rotational axial direction of the steering shaft, the first housing member including a cylindrical portion surrounding the steering shaft and a flange portion extending in a radial direction with respect to a rotational axis of the steering shaft to an outer side of the cylindrical portion in the radial direction;
a second housing member located on an other side in the rotational axial direction, the second housing member including a connection portion connected to the flange portion of the first housing member and a containing portion containing a part of the steering shaft, the second housing member forming a housing together with the first housing member;
a bearing provided at a position that overlaps the flange portion in the rotational axial direction on an inner peripheral side of the cylindrical portion of the first housing member, the bearing being configured to support the steering shaft; and
a sensor unit provided in the housing and configured to detect a steering angle that is a rotational angle of the steering shaft,
wherein the sensor unit includes
a first gear provided on an outer periphery of the steering shaft,
a second gear meshed with the first gear,
a third gear including teeth, a number of which is not dividable by a number of teeth of the second gear, the third gear being meshed with the second gear,
a first rotational sensor configured to detect a rotational angle of the second gear,
a second rotational sensor configured to detect a rotational angle of the third gear, and
a connector connected to a terminal of each of the first rotational sensor and the second rotational sensor,
wherein the connector is provided on one side of an imaginary line perpendicular to the rotational axis of the steering shaft, and
wherein a length of the flange portion in the radial direction with respect to the rotational axis of the steering shaft is longer on the one side of the imaginary line than on an other side of the imaginary line, and
wherein a material of the first housing member includes resin.

8. The steering apparatus according to claim 7, wherein the second gear includes a shaft portion extending to one side of the second gear in the rotational axial direction,
wherein the third gear includes a shaft portion extending to one side of the third gear in the rotational axial direction,
wherein the sensor unit includes a case having a containing space containing the second gear and the third gear and a cover closing an opening of the containing space,
wherein the shaft portion of the second gear and the shaft portion of the third gear are fitted in the case,
wherein other sides of the second gear and the third gear in the rotational axial direction face the cover,
wherein the first housing member includes a protrusion portion protruding toward a second housing side relative to the flange portion in the rotational axial direction of the steering shaft, the protrusion portion facing the cover,
wherein a sum of a distance between the second gear and the cover and a distance between the cover and the protrusion portion is smaller than a length of the shaft portion of the second gear in a rotational axial direction of the second gear, and
wherein a sum of a distance between the third gear and the cover and the distance between the cover and the protrusion portion is smaller than a length of the shaft portion of the third gear in a rotational axial direction of the third gear.

9. The steering apparatus according to claim 7, further comprising:
a first screw;
a second screw; and
a third screw,
wherein the flange portion and the connection portion are fastened to each other with use of the first screw, the second screw, and the third screw,
wherein the first screw and the second screw are located on the one side of the imaginary line, and
wherein the third screw is located on the other side of the imaginary line.

10. A steering apparatus comprising:
a steering mechanism including a steering shaft configured to rotate according to a rotation of a steering wheel, and a transmission mechanism configured to turn a turning target wheel according to the rotation of the steering shaft;
a first housing member located on one side in a rotational axial direction of the steering shaft, the first housing member including a cylindrical portion surrounding the steering shaft and a flange portion extending in a radial direction with respect to a rotational axis of the steering shaft to an outer side of the cylindrical portion in the radial direction;
a second housing member located on an other side in the rotational axial direction, the second housing member including a connection portion connected to the flange portion of the first housing member and a containing portion containing a part of the steering shaft, the second housing member forming a housing together with the first housing member; and
a bearing provided at a position that overlaps the flange portion in the rotational axial direction on an inner peripheral side of the cylindrical portion of the first housing member, the bearing being configured to support the steering shaft,
wherein a material of the first housing member includes resin,
wherein the first housing member includes
a plurality of first rib portions located on one side of the flange portion in the rotational axial direction and arranged in a circumferential direction around the rotational axis, and
a plurality of second rib portions located on an other side of the flange portion in the rotational axial direction and arranged in the circumferential direction around the rotational axis, and
wherein the first rib portions and the second rib portions are provided at positions offset from each other in the circumferential direction around the rotational axis.

11. A steering apparatus comprising:
a steering mechanism including a steering shaft configured to rotate according to a rotation of a steering wheel, and a transmission mechanism configured to turn a turning target wheel according to the rotation of the steering shaft;
a first housing member located on one side in a rotational axial direction of the steering shaft, the first housing member including a cylindrical portion surrounding the steering shaft and a flange portion extending in a radial direction with respect to a rotational axis of the steering shaft to an outer side of the cylindrical portion in the radial direction;
a second housing member located on an other side in the rotational axial direction, the second housing member including a connection portion connected to the flange portion of the first housing member and a containing portion containing a part of the steering shaft, the second housing member forming a housing together with the first housing member;
a bearing provided at a position that overlaps the flange portion in the rotational axial direction on an inner peripheral side of the cylindrical portion of the first housing member, the bearing being configured to support the steering shaft; and a screw configured to fasten the flange portion and the connection portion to each other, wherein, in a state before the flange portion and the connection portion are fastened to each other with use of the screw, a relative displacement allowable amount between the first housing member and the second housing member in the radial direction with respect to the rotational axis is larger than a dimension of a space between the steering shaft and the first bearing.

12. A steering apparatus comprising:

a steering mechanism including a steering shaft configured to rotate according to a rotation of a steering wheel, and a transmission mechanism configured to turn a turning target wheel according to the rotation of the steering shaft;

a first housing member located on one side in a rotational axial direction of the steering shaft, the first housing member including a cylindrical portion surrounding the steering shaft and a flange portion extending in a radial direction with respect to a rotational axis of the steering shaft to an outer side of the cylindrical portion in the radial direction;

a second housing member located on an other side in the rotational axial direction, the second housing member including a connection portion connected to the flange portion of the first housing member and a containing portion containing a part of the steering shaft, the second housing member forming a housing together with the first housing member;

a bearing provided at a position that overlaps the flange portion in the rotational axial direction on an inner peripheral side of the cylindrical portion of the first housing member, the bearing being configured to support the steering shaft; and a cylindrical sleeve member between the first housing member and the bearing, wherein a material of the first housing member includes resin, wherein the bearing is a needle bearing, wherein a material of the sleeve member includes metal, and wherein the flange portion is provided at an intermediate portion of the sleeve member in the rotational axial direction.

13. A steering apparatus comprising:

a steering mechanism including a steering shaft configured to rotate according to a rotation of a steering wheel, and a transmission mechanism configured to turn a turning target wheel according to the rotation of the steering shaft;

a first housing member located on one side in a rotational axial direction of the steering shaft, the first housing member including a cylindrical portion surrounding the steering shaft and a flange portion extending in a radial direction with respect to a rotational axis of the steering shaft to an outer side of the cylindrical portion in the radial direction;

a second housing member located on an other side in the rotational axial direction, the second housing member including a connection portion connected to the flange portion of the first housing member and a containing portion containing a part of the steering shaft, the second housing member forming a housing together with the first housing member;

a bearing provided at a position that overlaps the flange portion in the rotational axial direction on an inner peripheral side of the cylindrical portion of the first housing member, the bearing being configured to support the steering shaft; and a cylindrical sleeve member between the first housing member and the bearing, wherein a material of the first housing member includes resin, wherein the bearing is a needle bearing, wherein a material of the sleeve member includes metal, and wherein a groove extending in a circumferential direction around the rotational axis is provided on an outer peripheral side of the sleeve member, and the sleeve member is fixed to the first housing member by inert-molding.

14. A steering apparatus comprising:

a steering mechanism including a steering shaft configured to rotate according to a rotation of a steering wheel, and a transmission mechanism configured to turn a turning target wheel according to the rotation of the steering shaft;

a first housing member located on one side in a rotational axial direction of the steering shaft, the first housing member including a cylindrical portion surrounding the steering shaft and a flange portion extending in a radial direction with respect to a rotational axis of the steering shaft to an outer side of the cylindrical portion in the radial direction;

a second housing member located on an other side in the rotational axial direction, the second housing member including a connection portion connected to the flange portion of the first housing member and a containing portion containing a part of the steering shaft, the second housing member forming a housing together with the first housing member;

a bearing provided at a position that overlaps the flange portion in the rotational axial direction on an inner peripheral side of the cylindrical portion of the first housing member, the bearing being configured to support the steering shaft; and a cylindrical sleeve member between the first housing member and the bearing, wherein a material of the first housing member includes resin, wherein the bearing is a needle bearing, wherein a material of the sleeve member includes metal, and wherein a groove extending in the rotational axial direction is provided on an outer peripheral side of the sleeve member, and the sleeve member is fixed to the first housing member by inert-molding.

* * * * *